Figure 1:
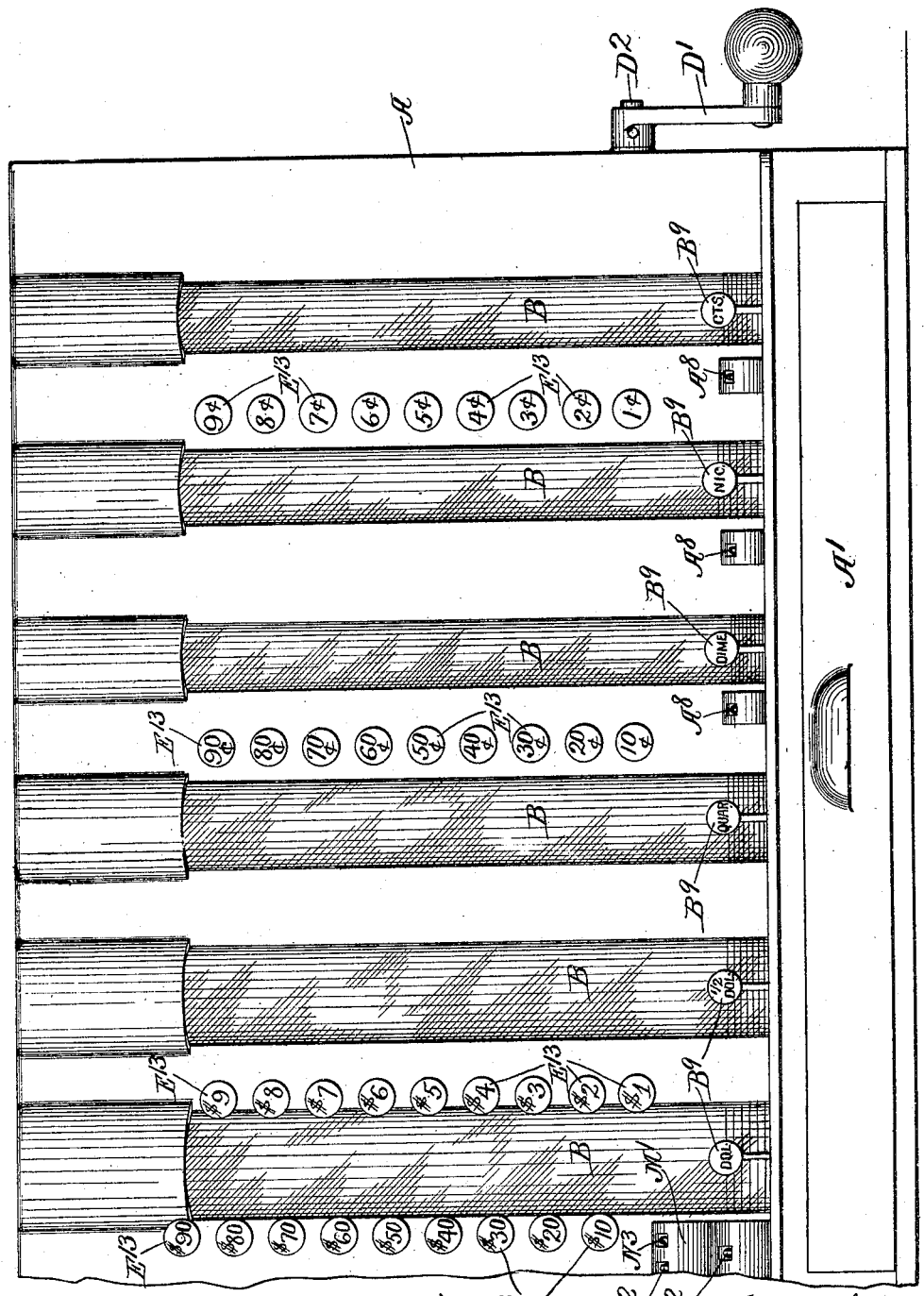

No. 807,724. PATENTED DEC. 19, 1905.
S. G. COOK.
CASH REGISTER.
APPLICATION FILED FEB. 2, 1903.

16 SHEETS—SHEET 5.

Fig. 5.

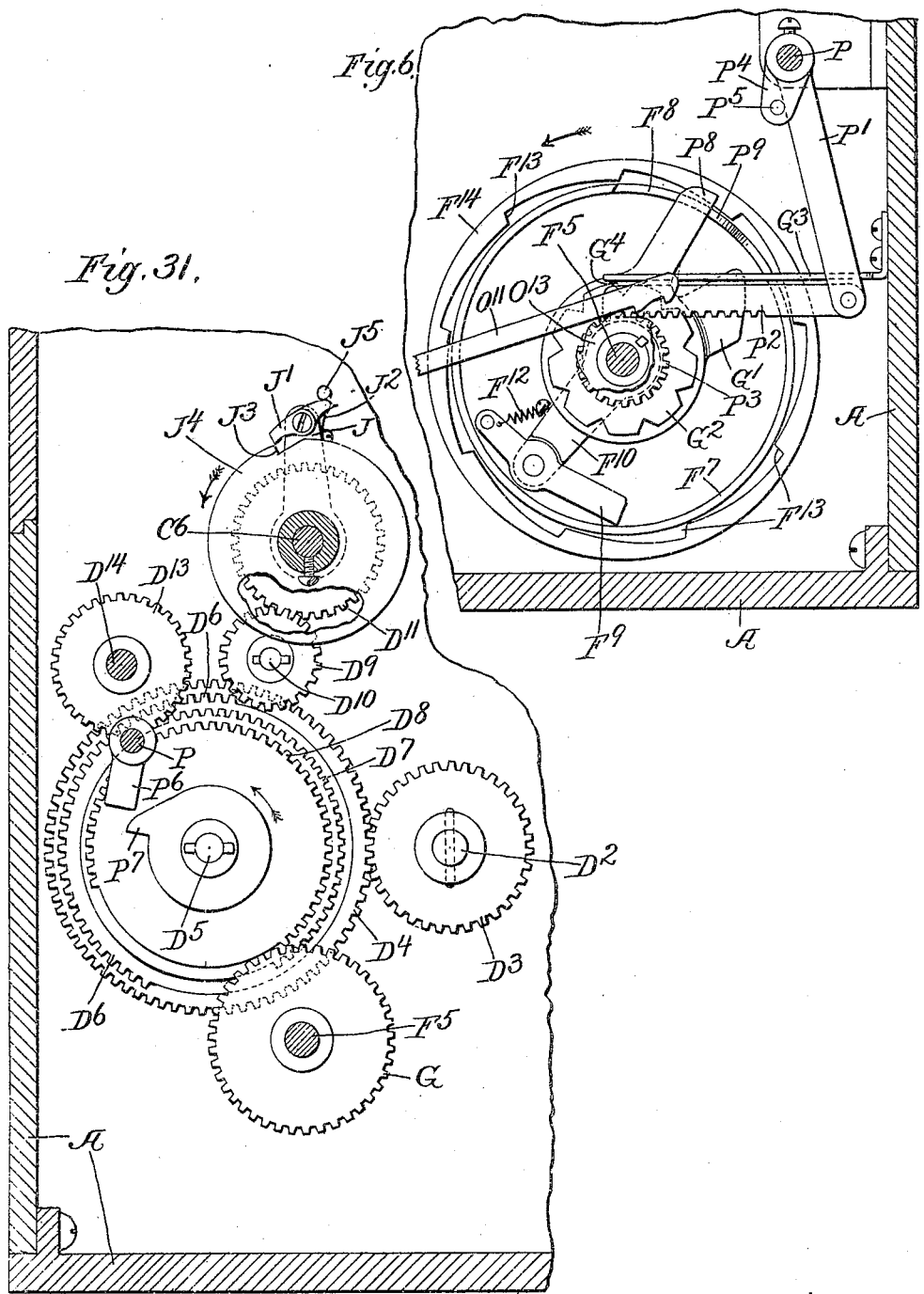

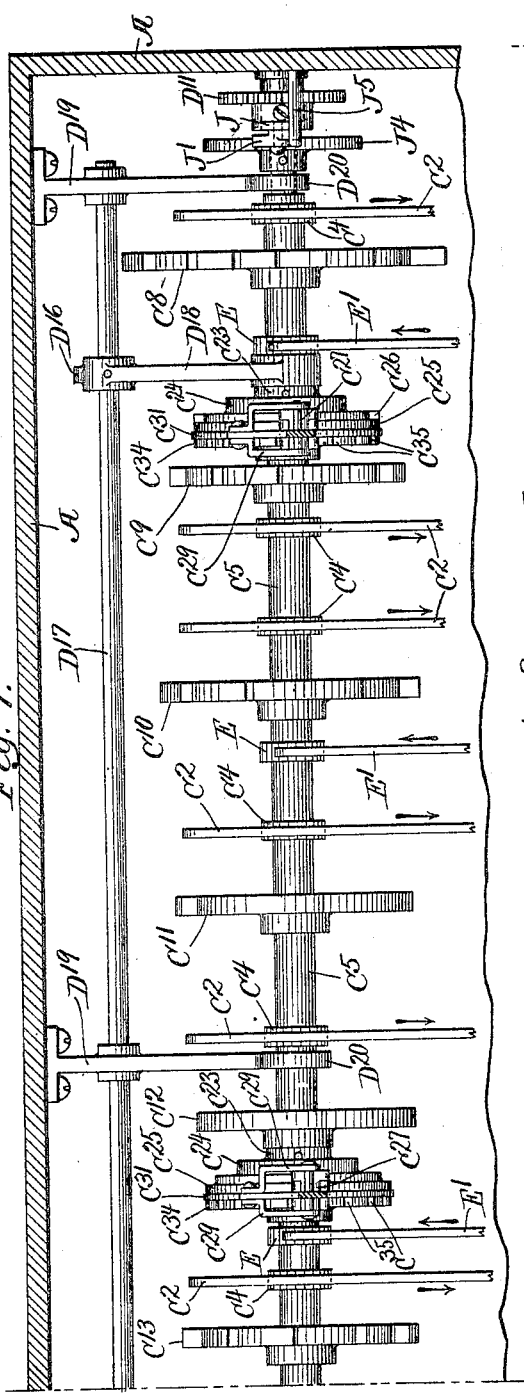

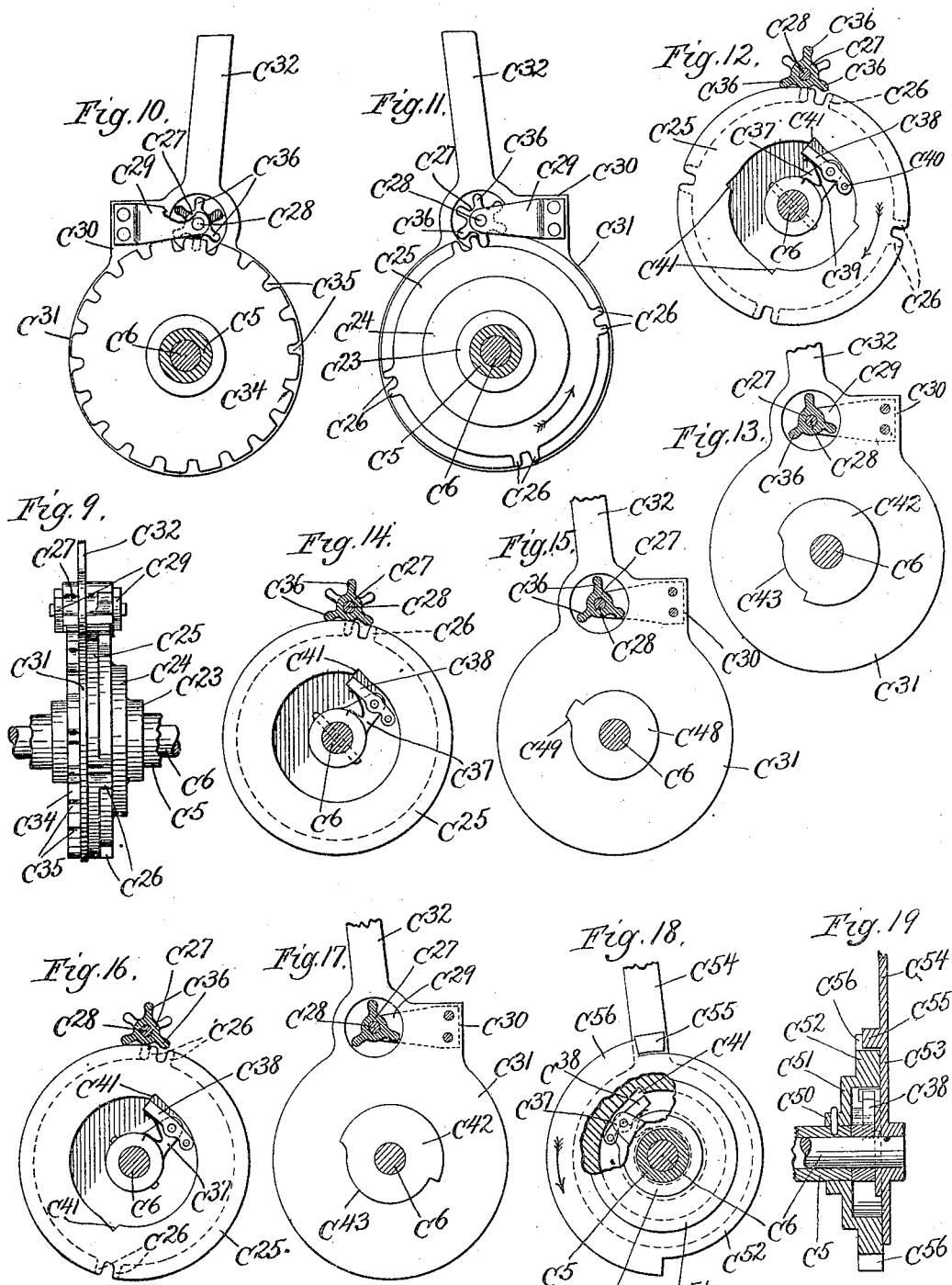

No. 807,724. PATENTED DEC. 19, 1905.
S. G. COOK.
CASH REGISTER.
APPLICATION FILED FEB. 2, 1903.
16 SHEETS—SHEET 9.
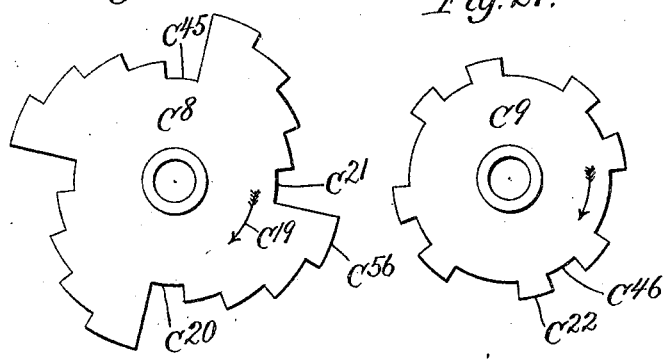
Fig. 20. Fig. 21. Fig. 22.
 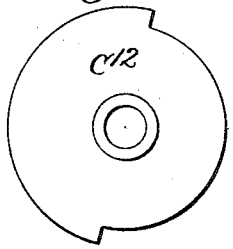 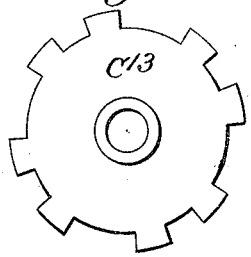
Fig. 23. Fig. 24. Fig. 25.
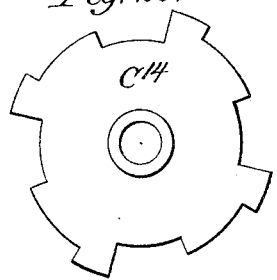 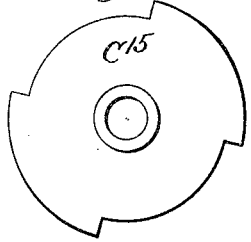 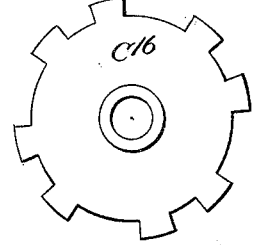
Fig. 26. Fig. 27. Fig. 28.
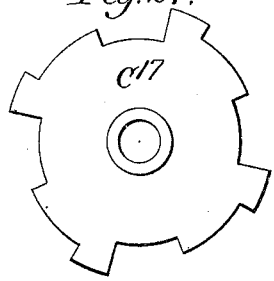 
Fig. 29. Fig. 30.
Witnesses.
Edward T. Wray.
Homer L. Kraft.
Inventor.
Samuel G. Cook.
by Parker Carter
Attorney's.

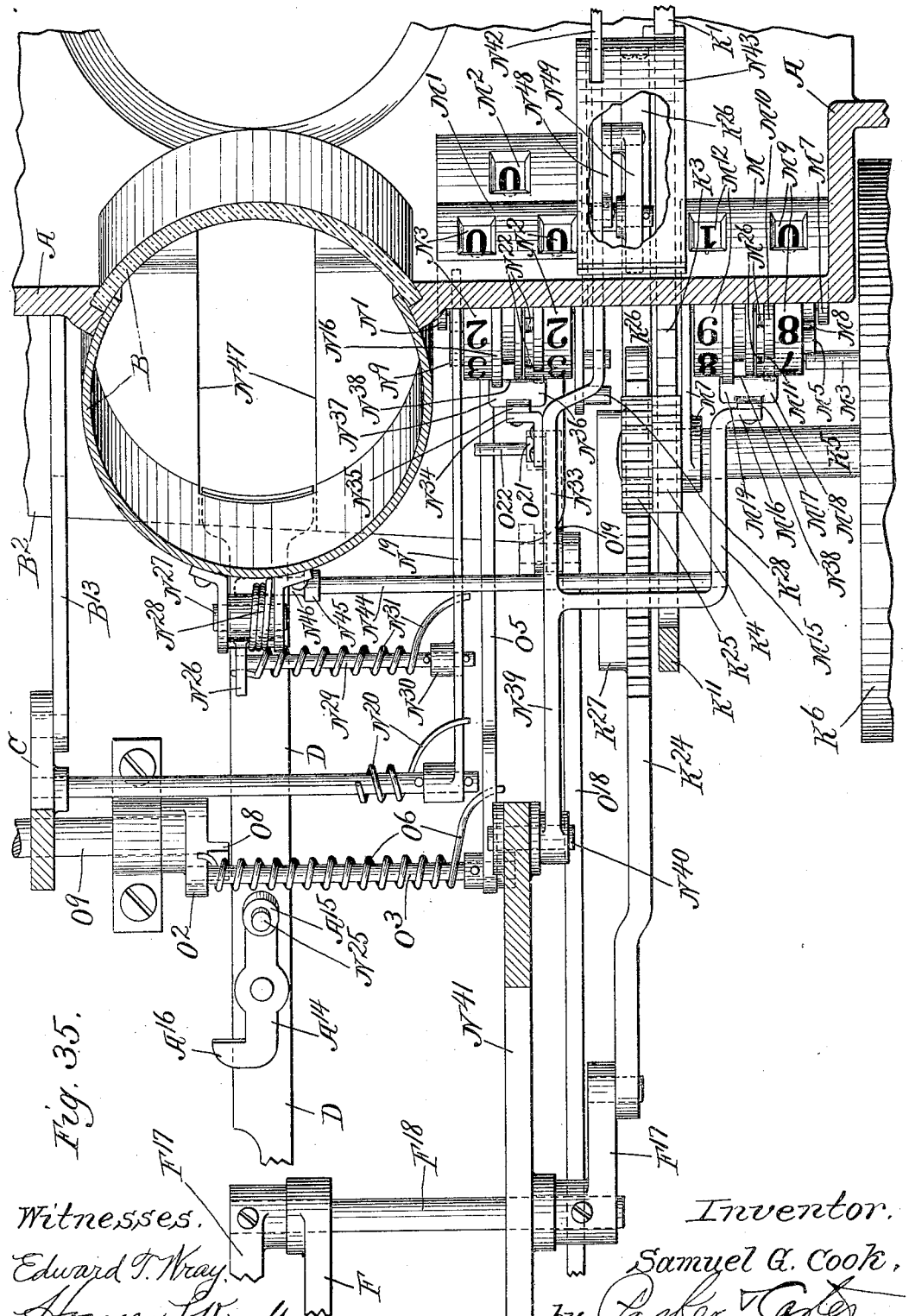

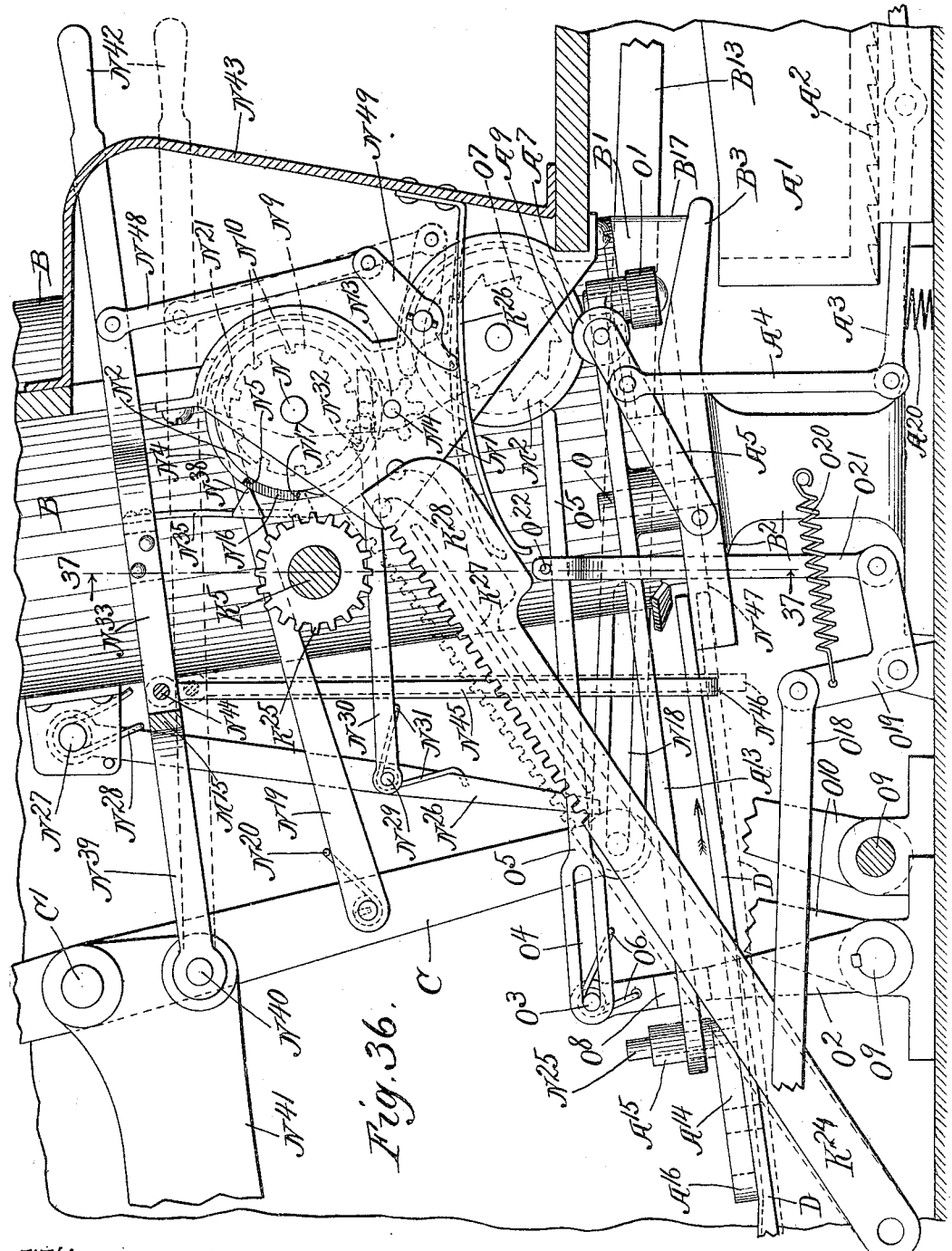

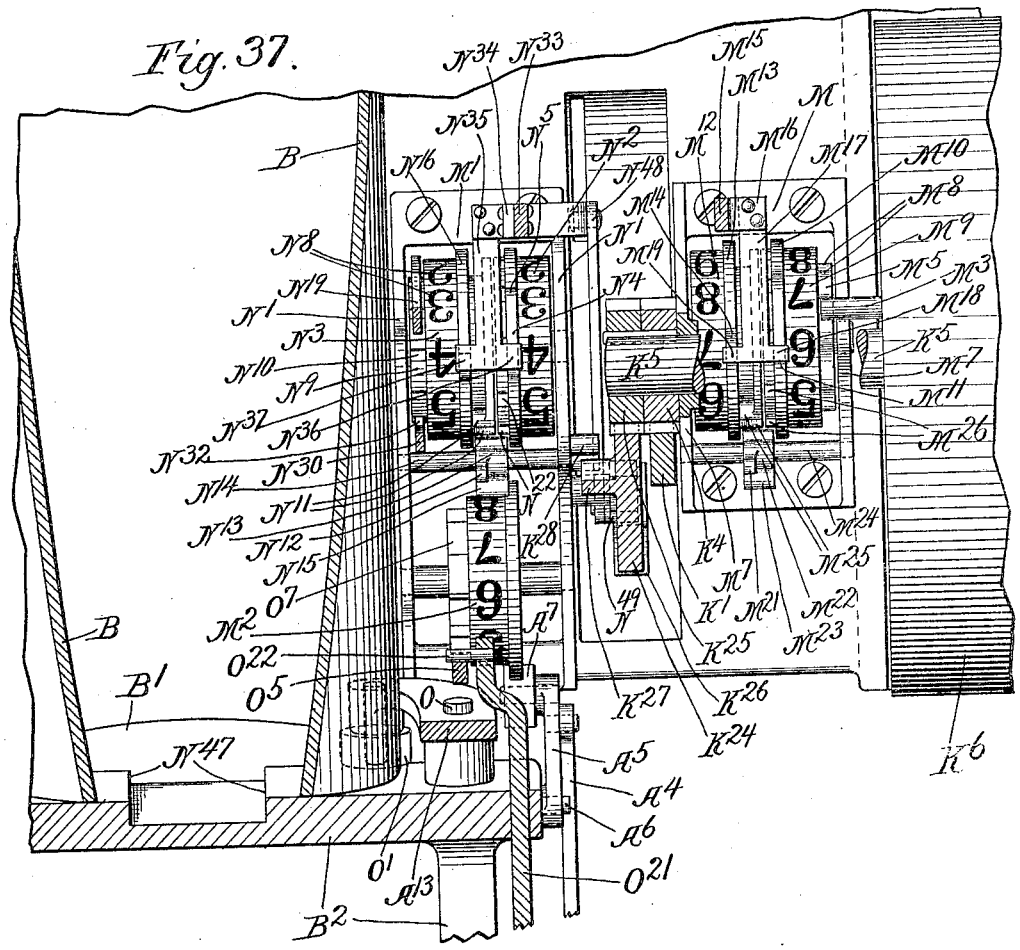
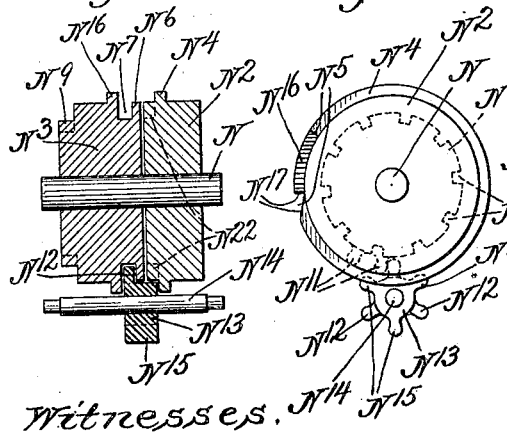
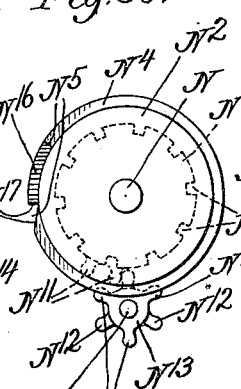
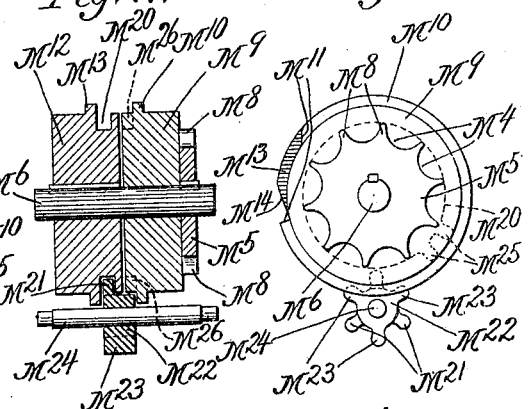

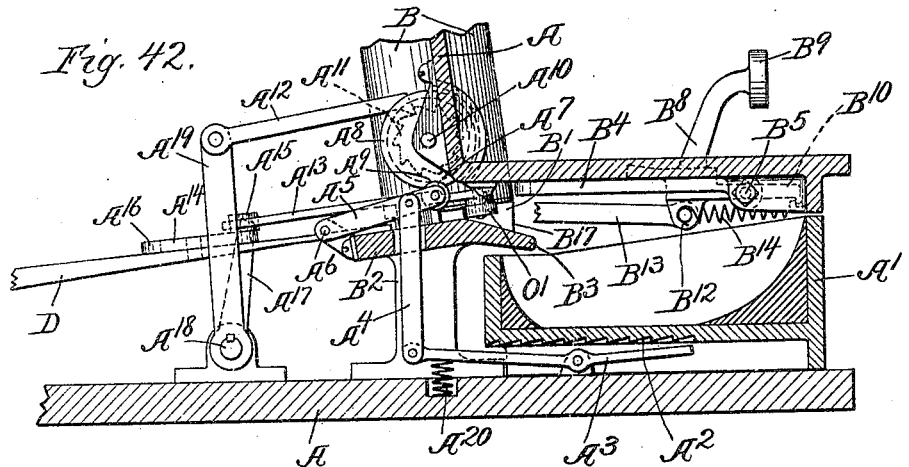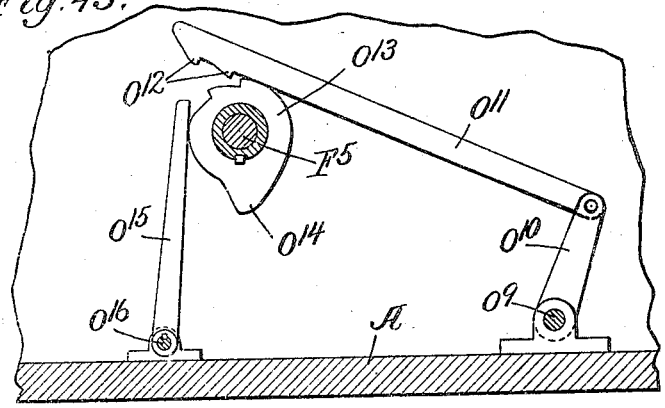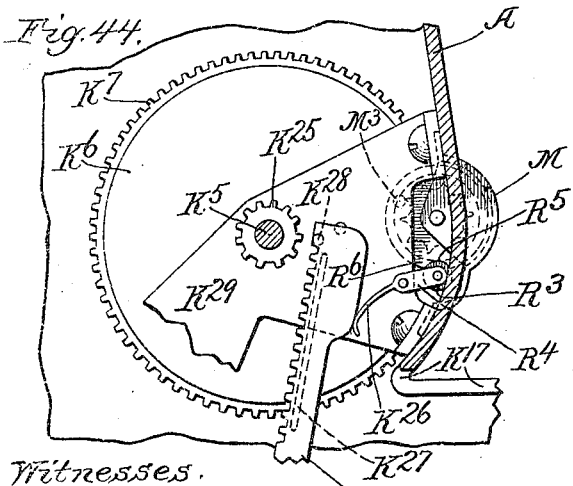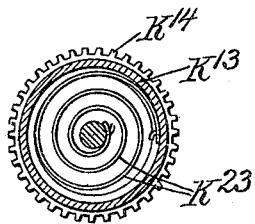

UNITED STATES PATENT OFFICE.

SAMUEL G. COOK, OF EAST ST. LOUIS, ILLINOIS, ASSIGNOR TO JACOB J. WISEMAN, TRUSTEE, AND EDWARD J. VAUGHN AND GEORGE D. LOCKE, SUCCESSORS IN TRUST, OF JERSEYVILLE, ILLINOIS.

CASH-REGISTER.

No. 807,724.        Specification of Letters Patent.        Patented Dec. 19, 1905.

Application filed February 2, 1903. Serial No. 141,491.

*To all whom it may concern:*

Be it known that I, SAMUEL G. COOK, a citizen of the United States, residing at East St. Louis, in the county of St. Clair and State of Illinois, have invented a certain new and useful Improvement in Cash-Registers, of which the following is a specification.

My invention relates to a cash-register, although in using this word I do not wish to be understood as confining it to its ordinary significance. I use the term in a broad sense to indicate my apparatus or an apparatus containing any of my several devices, although I do much more than would be done by a mere cash-register.

My invention has for some of its objects to keep the cash in the register beyond the control of the operator except as to the change; to automatically determine the change and discharge it; to compute the change, although the receipts may be made in a series and the purchases indicated in a series; to indicate the total cash in a given receiver, the amount put into the machine, the total sum of several amounts put into the machine by the purchaser, the amount of the purchase and the total sum of several purchases made at the same time by the same purchaser, such several purchases being registered separately or as a total; to indicate the remainder, or the amount of change due such purchaser; to produce various other results and to employ various other movements or motions, as are hereinafter more fully described and claimed.

I wish it understood that what I have illustrated and hereinafter described is not to be taken as the sole form of my invention, but rather as in a sense a diagrammatic illustration of the various features and devices which may or may not be used altogether for the purpose of making up a complete machine. Some of my several features are capable of more or less independent action and are capable of being combined with some or all of the other features shown or with still other features not here shown.

I have illustrated in a diagrammatic way an application of my invention in the accompanying drawings, wherein—

Figure 2:
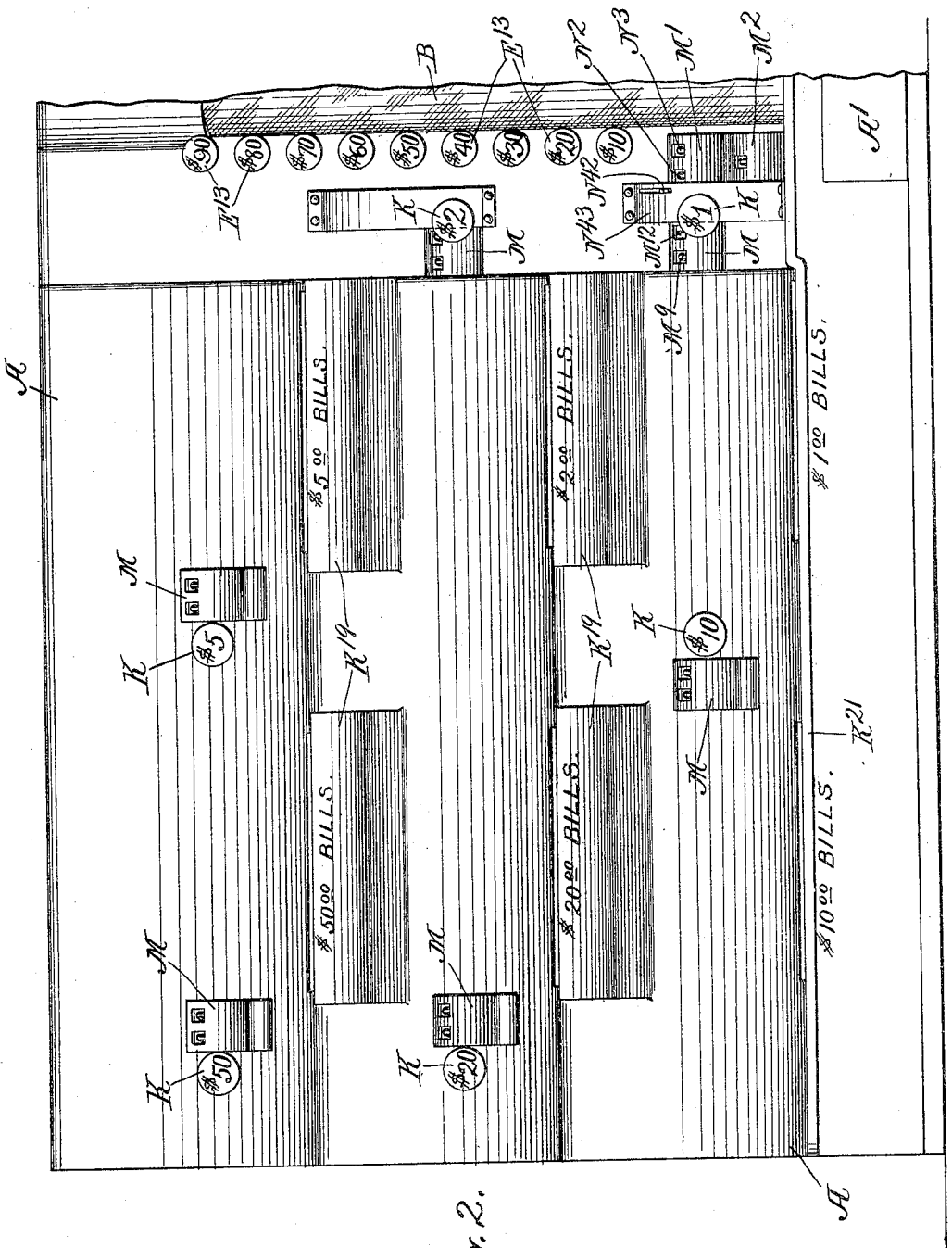
Figure 3:
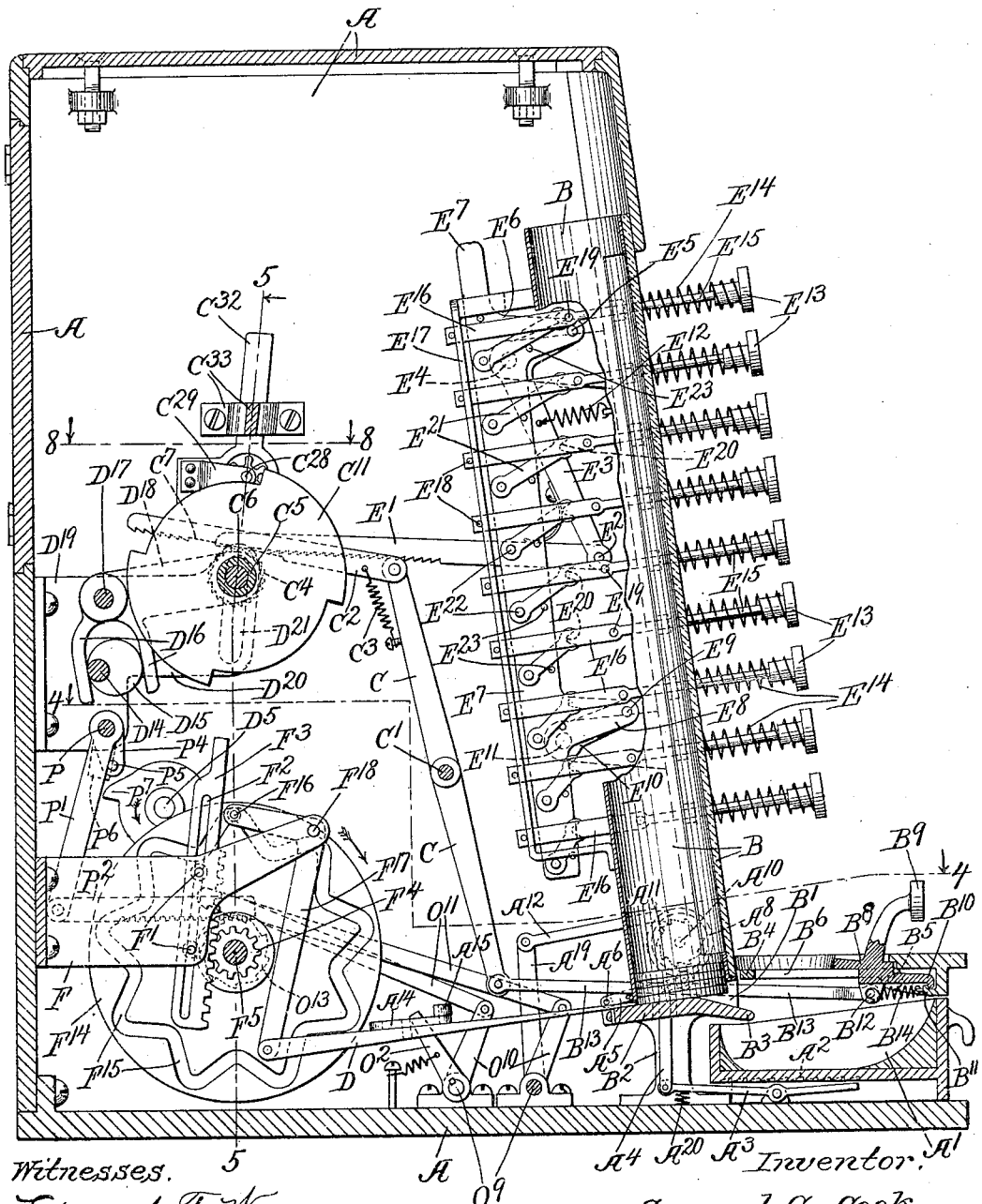
Figure 4:
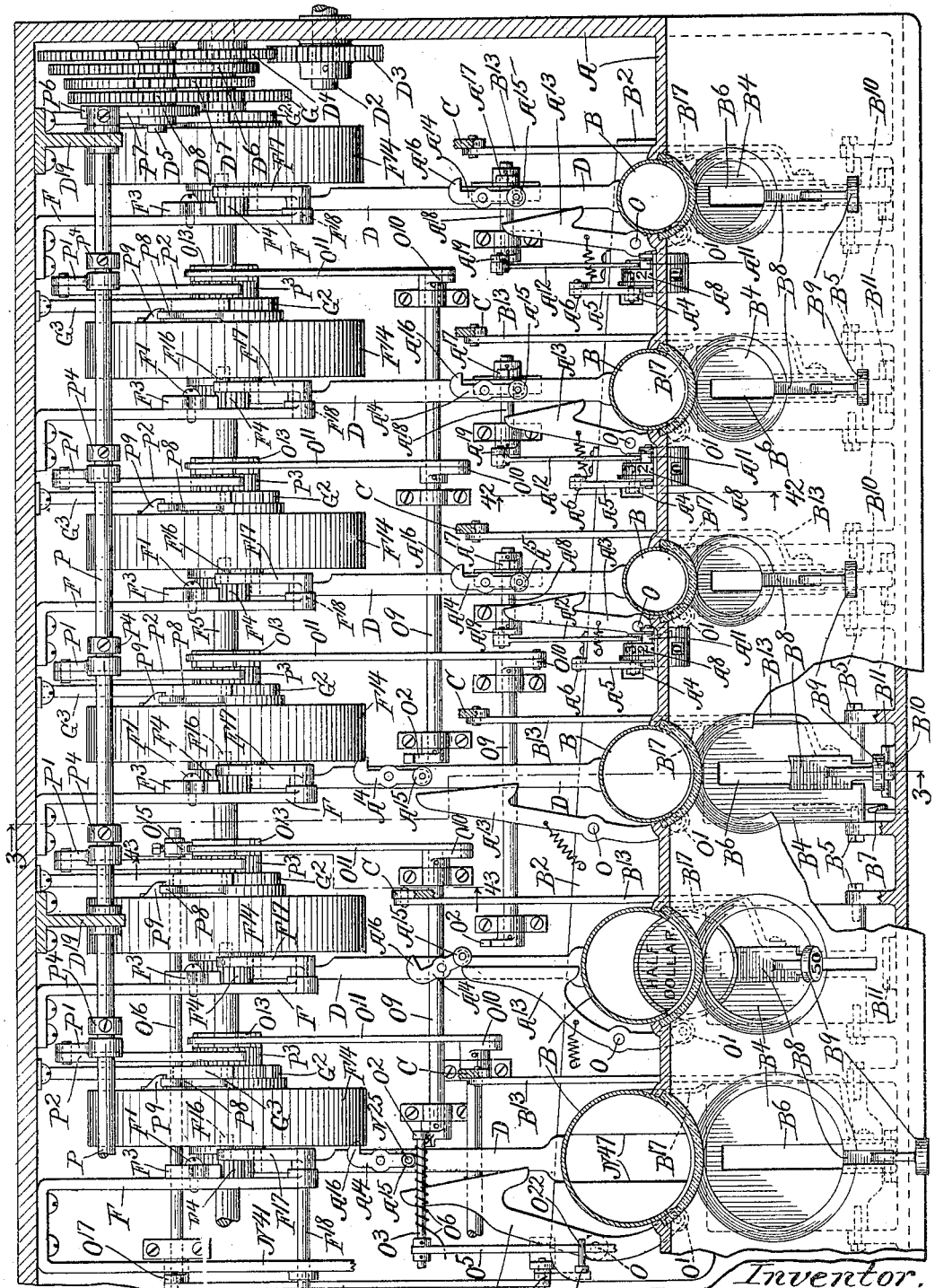
Figure 32:
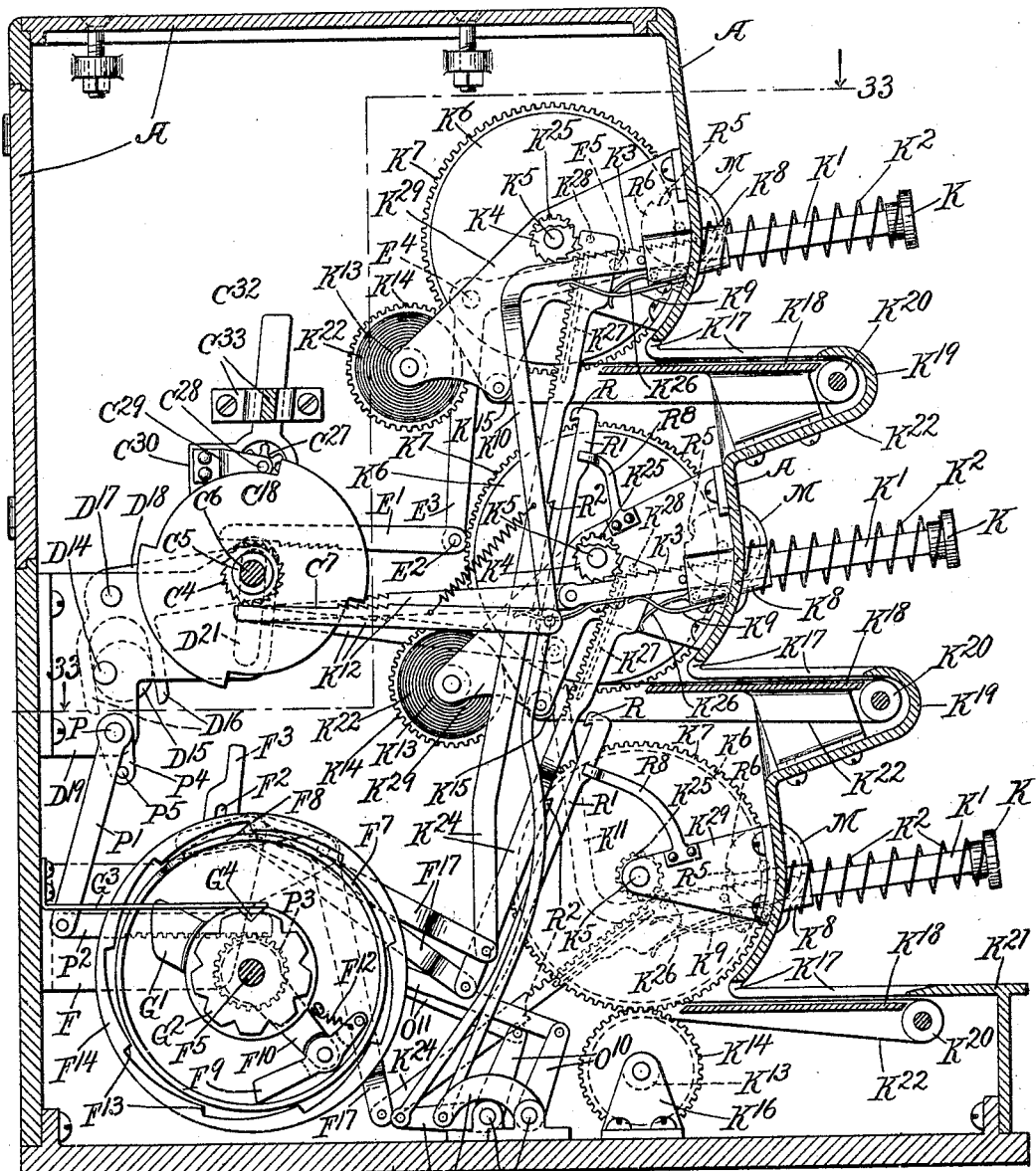
Figure 33:
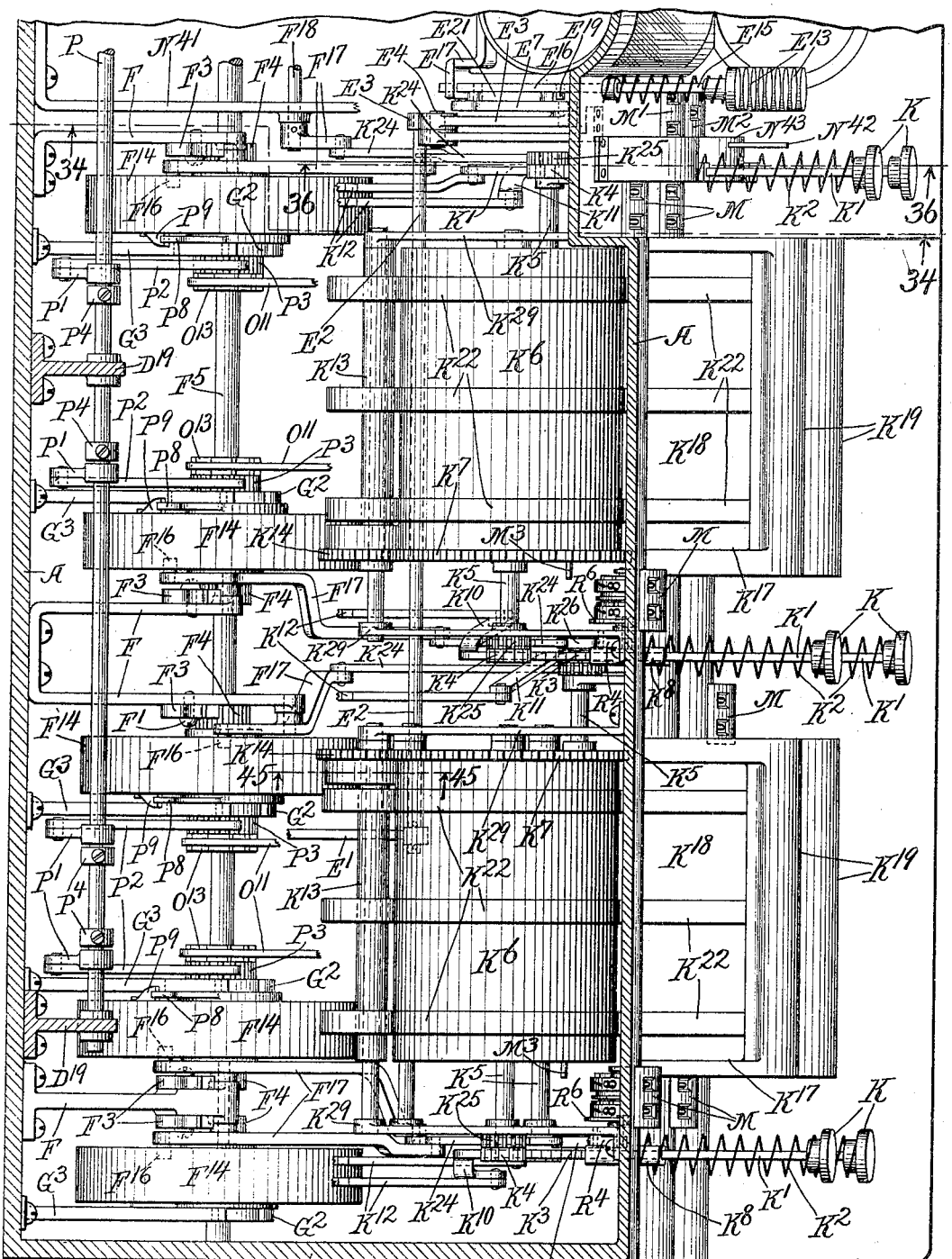
Figure 34:
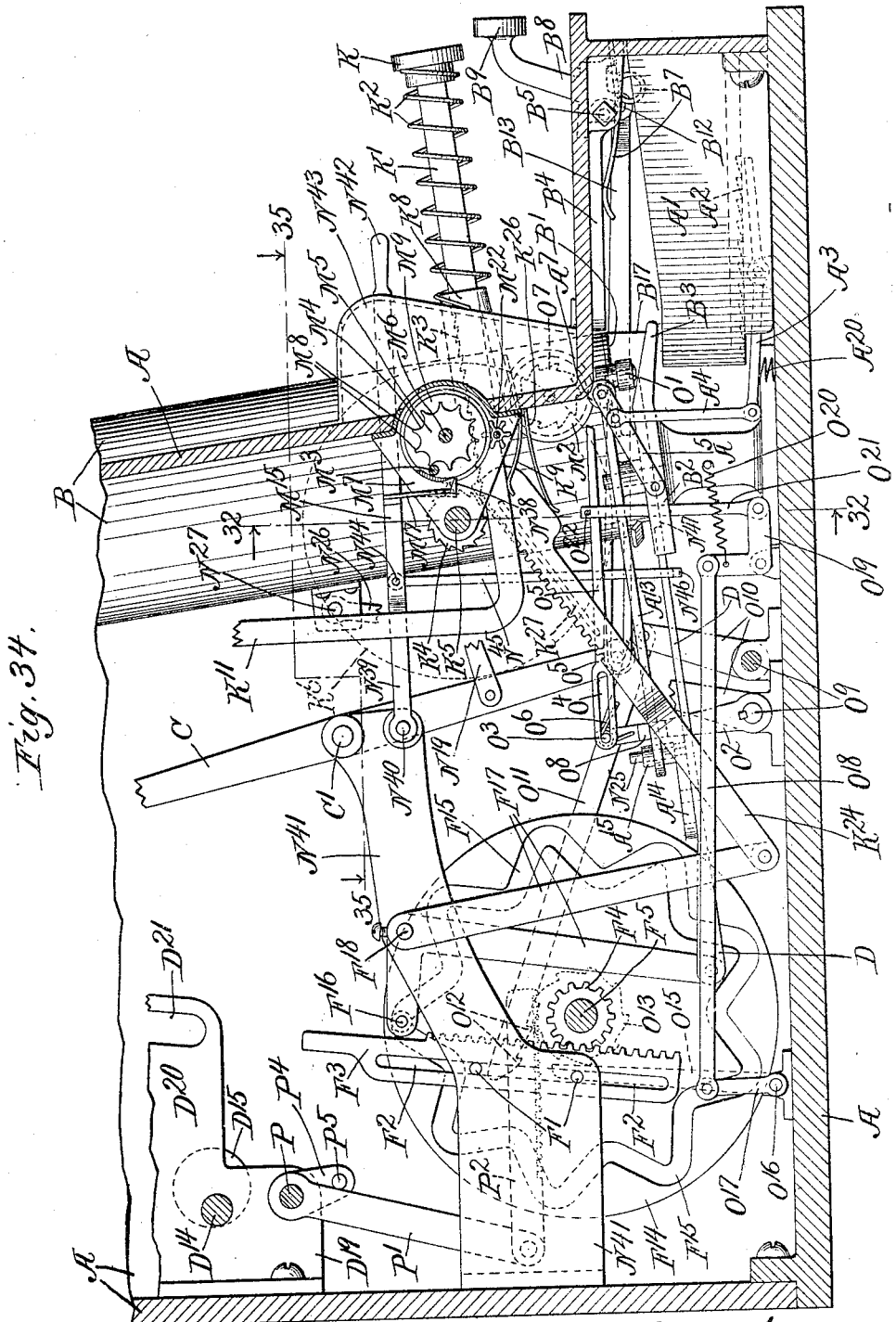

Figure 1 is an elevation of the coin end of my device on the side where the operator stands. Fig. 2 is a like elevation of the bill end of my device. Fig. 3 is a cross-section on line 3 3, Fig. 4. Fig. 4 is a horizontal section on line 4 4, Fig. 3. Fig. 5 is a section on line 5 5, Fig. 3, showing only a part of the mechanism. Fig. 6 is a side elevation of the discharge-wheel. Figs. 7 and 8 are plan views of the shaft and associated parts of the calculator. Figs. 9 to 17, inclusive, are details of the resetting and coupling devices on the calculating-shaft. Figs. 18 and 19 are details of the resetting device on the calculating-shaft for resetting the ten-dollar, twenty-dollar, and fifty-dollar disks. Figs. 20 to 30, inclusive, are details of the disks of the calculator. Fig. 31 is a detail on line 31 31, Fig. 5. Fig. 32 is an end view of the bill mechanism with the outside casing removed. Fig. 33 is a sectional plan view on line 33 33, Fig. 32. Fig. 34 is a detail of the substituting mechanism for substituting paper dollars and silver dollars on a section made at line 34 34, Fig. 33. Fig. 35 is a section on line 35 35, Fig. 34. Fig. 36 is an enlarged detail of a portion of the devices shown in Fig. 34 on a section made at line 36 36, Fig. 33. Fig. 37 is a section on line 37 37, Fig. 36. Figs. 38 and 39 are details of silver-dollar index. Figs. 40 and 41 are details of paper-dollar index. Fig. 42 is a detail section on line 42 42, Fig. 4, showing the nickel-deficiency index. Fig. 43 is a detail section on line 43 43, Fig. 4. Fig. 44 is a detail view showing the fifty-dollar index. Fig. 45 is a detail section on line 45 45, Fig. 33.

Like parts are indicated by the same letter in all the figures.

Referring to Fig. 3, A is the case which incloses the mechanism. A' is the drawer, provided on its lower side with a ratchet $A^2$, which is associated with one end of a pivoted lever $A^3$, the other end of which is provided with an upwardly-projecting rod $A^4$, which is attached to a lever $A^5$, pivoted at $A^6$ and which may carry at its other end the roller $A^7$. This roller bears against a cylinder $A^8$, which is notched at $A^9$ to receive the end of (or in this case the roller $A^7$ on) the lever $A^5$. The cylinder is mounted on the short shaft $A^{10}$, which carries the ratchet-wheel $A^{11}$, associated with the dog $A^{12}$. When the coin-discharge rod D moves forward and fails to push out a coin, then the pivoted lever $A^{13}$, connected with the quarter-discharging device, as shown in Fig. 42, will remain at rest, as indicated in Fig. 4. If a coin is pushed out, it will be rocked on its pivot by the edge of the coin encountering in its passage the roll O'. (Shown in Figs. 4 and 34.) When, however, it remains at rest, it will be because there is no coin in the receiver associated with such moving discharge-rod D. Mounted on the coin-discharge rod is a little pivoted lever $A^{14}$, one end of which carries, preferably, a roller $A^{15}$ in the path of the lever $A^{13}$ and the other end of which carries the hook $A^{16}$. In the case shown in Fig. 4 the hook $A^{16}$ will engage the upper end of the pivoted link $A^{17}$ and rock it on its pivot, thus rocking the shaft $A^{18}$, which carries the arm $A^{19}$, connected with the dog $A^{12}$, and thus carry forward the pivoted dog $A^{12}$, which engages the teeth of the ratchet-wheel $A^{11}$, and thus rotates the same and its shaft. On this shaft is mounted the deficiency-indicator index wheel or cylinder $A^8$, which is carried around by this action, so as to indicate the number of times that the coin-discharger has ineffectually worked, thus indicating the number of coins of that specific variety which are deficient. The rotation of this cylinder $A^8$ will of course act upon the roller $A^7$ in the end of the lever $A^5$ and depress the same, thus depressing the rod or link $A^4$ and with it the rear end of the lever $A^3$, the other end of which thereupon moves into the rack in the bottom of the drawer, locking the drawer open to serve as a reminder to the operator that somewhere in the machine there is a deficiency in the matter of change. The spring $A^{20}$ (shown in Fig. 3) tends to keeps the parts in the position where the drawer will be unlocked.

The parts as described up to the present time, it being understood that some of the parts referred to will be described further on, operate as follows: The drawer being closed and the machine ready for operation the money will be put into the machine and the various operations will be had, which have for their object to discharge the proper amount of change. The operator now pulls out the drawer to get the money, and if the proper change is in the machine he will find it in the drawer. If he does not find it in the drawer, he will find by the operation of the mechanism last described that he cannot push the drawer in, and therefore will know not only by an examination of the coin, but by the condition of the machine, that there is a deficiency in change. The deficiency wheel or wheels will indicate how many coins and of what particular variety are deficient, or the wheels might be lettered or figured so as to indicate the amount lacking. These are details which can be varied at will.

I will now describe the mechanism by which the coins received are inserted in the machine, and I particularly refer to parts shown in Figs. 3, 4, 34, and 42. B is a coin-receiver, in connection with which the coin-discharger and the deficiency-indicator operate. At the bottom of the receiver is an opening B', which serves as a receiving and discharging opening for the coin in such receiver. The receiver is suitably mounted on a standard $B^2$ within the case and preferably is provided at the bottom of the aperture B' with a discharging-ledge $B^3$, which is adapted to discharge into the drawer. Above the drawer is mounted the cash-inserter, in this case a coin-inserter. This coin-inserter consists of a tray $B^4$, (shown in Figs. 3, 4, 34, and 42,) pivoted at $B^5 B^5$ and slotted at $B^6$ and provided with a spring $B^7$, (found on Figs. 4 and 34,) which tends to move it up into the position indicated in Fig. 3. Associated with this tray is a slide $B^8$, provided with a thumb-piece $B^9$, a rear hook $B^{10}$, which takes over a fixed hook $B^{11}$, a downwardly-depending part $B^{12}$, which is pivoted to the rod $B^{13}$, and a retracting-spring $B^{14}$. The slide rests upon the tray, and when the tray is lowered at its forward end by rocking on its pivot $B^5$ the slide is carried down and the hooks $B^{10}$ and $B^{11}$ are disengaged, and the operator can push the coin in by moving the slide forward against the action of the spring $B^{14}$, which subsequently retracts it. Thus when a coin is placed in the tray and pressure is applied to the thumb-piece $B^9$ the first tendency will be to rock the tray on its pivot $B^5$ and force it down so that the coin will be opposite the receiving-opening of the coin-receiver, and then by continuing the pressure on this thumb-piece the slide will move forward into the slot, thus pushing the coin in beneath the other coins in the receiver. When this action is completed and the parts released, the springs $B^7$ and $B^{14}$ will restore the parts to their normal position. (Shown in Fig. 3.) This tray and slide and associated parts I have described as the "cash-inserter." In connection with bills I show elsewhere a different form of cash-inserter, though both are included under the general title "cash-inserter." The particular form just described might be called a "coin-inserter."

I will now refer particularly to Figs. 7, 8, 10 to 30. The rod $B^{13}$ is connected with the lower end of the rocking lever C, pivoted at C', to the upper end of which is attached the ratchet-bar $C^2$, held down in position by means of the spring $C^3$, which is attached to both the ratchet-bar and the lever. This ratchet-bar engages the teeth of a ratchet-wheel $C^4$ on the sleeve $C^5$ on the shaft $C^6$. The ratchet-teeth on the ratchet-bar $C^2$ are cut away at $C^7$. It will be understood that there are a series of these constructions and that these cut-away portions $C^7$ vary in length. The arrangement is such that the cut-away portions $C^7$ of the devices are made to correspond to the value of the coin introduced, and therefore when a coin is forced in by its coin-inserter its bar $B^{13}$ is moved inwardly and the several parts operated, so that the sleeve $C^5$, which is loose on the shaft, is rotated a certain predetermined distance appropriate to the value of the coin introduced. On this sleeve are fixed a series of selector-wheels $C^8$, $C^9$, $C^{10}$, $C^{11}$, $C^{12}$, $C^{13}$, $C^{14}$, $C^{15}$, $C^{16}$, $C^{17}$, and $C^{18}$, (see Figs. 20 to 30,) there being one such selector-wheel for each denomination of money for which the machine is adapted and one cash-inserter with associated rod, lever, and rack-bar for each cash-receiver. Thus whenever any cash is inserted and a cash-inserter is operated the result will be that the associated section of the sleeve with its selector-wheels will be rotated and the particular selector-wheel associated with the cash-inserter will be brought to the proper position, as hereinafter explained. These selector-wheels are associated with cash-receivers—$C^8$ with the penny-receiver, $C^9$ with the nickel-receiver, $C^{11}$ with the receiver of quarters, &c. The sleeve $C^5$ is divided up into sections, one section carrying the selector-wheel $C^8$, the next the selector-wheels $C^9$ to $C^{12}$, inclusive, the next the selector-wheels $C^{13}$ to $C^{15}$, inclusive, and the next the selector-wheels $C^{16}$ to $C^{18}$, inclusive. These several selector-wheels and their associated parts just described are operated whenever money is inserted in the machine for the purpose of bringing the several selector-wheels to a certain position, dependent upon the amount of money so introduced, and dependent also upon the number of coins or bills introduced and their respective denominations. I shall now describe the manner in which this is brought about, leaving the object of such arrangement to be developed later. When a certain amount is received, the coin-receiving device is operated as suggested and the parts associated with such coin-receiving device will operate to cause one of the ratchet-bars $C^2$ to move. This ratchet has a certain number of its teeth removed, and so will tend to turn its associated selector-wheel a certain predetermined distance. For example, if a penny is put into the machine it will operate to turn the selector-wheel $C^8$ a distance of one projection. In Figs. 20 to 30 the selector-wheels are shown in their normal positions, and if a penny be so inserted as suggested the selector-wheel $C^8$ will be moved in the direction indicated by the arrow $C^{19}$ on the body of the wheel one projection. In like manner if any coin—as, for instance, a dime or dollar—be inserted its associated selector-wheel will be made to rotate in the same direction an amount dependent upon the value of the coin, and so the selector-wheels will be brought, as indicated, each to its proper position and away from its normal position by the introduction of a coin associated with each of said selector-wheels. If now five pennies be put in successively, obviously the wheel $C^8$ (shown in Figs. 7 and 20) will be moved five projections, so that it will have made one-quarter of a revolution, and the point $C^{20}$, which for convenience I will call the "zero-point," of such wheel under normal conditions will have moved around, and the point $C^{21}$ will be in the vertical line below the axis of the wheel, the position formerly occupied by the point $C^{20}$. This, however, should and in my apparatus does carry forward the nickel-wheel, so as to bring its first projection $C^{22}$ into what I will call the "operative position." By the "operative position" of these several projections and points on these several wheels I mean that position which will enable the wheel to become effective in carrying out the operation hereinafter to be described.

I will now describe the mechanism by which the motion of the wheel $C^8$ is transmitted to the wheel $C^9$. (Shown in Figs. 7 and 9 to 17.) Mounted on the first section of the sectional sleeve $C^5$, which carries the penny-wheel $C^8$, is a disk consisting of the hub portion $C^{23}$, the body portion $C^{24}$, and the rim $C^{25}$. This rim $C^{25}$ has at intervals of ninety degrees teeth $C^{26}$, arranged in pairs. Obviously, as the section of the sleeve $C^5$ associated with the wheel $C^8$ moves with such wheel, as described, as the pennies are introduced it will carry this disk around ninety degrees in the direction of the arrow in Fig. 11, and when the five pennies have been introduced it will carry it to the point where the next pair of teeth will engage and rotate the pinion $C^{27}$ until the parts assume a position like that indicated in Fig. 11. This pinion is mounted on the shaft $C^{28}$, which is supported on the arms $C^{29}$, mounted on a projection $C^{30}$ on the flat disk $C^{31}$. This disk has an upwardly-projecting arm $C^{32}$, which passes through a slot in the guide-bar $C^{33}$. (Shown in Fig. 3.) On the opposite side of this flat disk $C^{31}$ is a disk $C^{34}$, (shown in Figs. 7 and 9,) keyed to the next section of the sleeve $C^5$. The outer edge of this disk is provided with a series of notches $C^{35}$ $C^{35}$, there being twenty of such notches, which are adapted to receive the teeth $C^{36}$ on the pinion $C^{27}$. These several teeth and notches may be variously arranged; but the intention is to adjust or coördinate them, as indicated, so that when the first section of the sleeve shall have rotated one-quarter of a circle the next section will be rotated one-twentieth of a circle.

The parts above referred to will be found in connection with Figs. 7, 11, and 12, as well as elsewhere.

The devices illustrated in Figs. 9, 10, 11, 12, and 13 are those associated with the penny-wheel $C^8$, and such as are adapted to transmit the motion imparted to this wheel and its sleeve-section to the next sleeve-section, which will carry the nickel-wheel, dime-wheel, quarter-wheel, and half-dollar wheel, or the wheels or disks indicated in Figs. 21, 22, 23, and 24 as $C^9$, $C^{10}$, $C^{11}$, and $C^{12}$, respectively. Inside the body portion $C^{24}$ is the arm $C^{37}$, keyed to the shaft $C^6$ and carrying the pivoted dog $C^{38}$, which is associated with a spring $C^{39}$ to force one end outwardly and with a cross-pin $C^{40}$ on its other end. On the inside of the outer rim $C^{25}$ are the notches $C^{41}$, arranged at intervals of ninety degrees and adapted to receive one end of the dog $C^{38}$, while the pin $C^{40}$ projects outwardly into the path of the boss $C^{42}$ (shown in Fig. 13) on the disk $C^{31}$. This boss is provided with a cam portion $C^{43}$, which when it receives the pin $C^{40}$ permits the dog to rock on its pivot and allows its other end to drop into one of the notches $C^{41}$. By this device and by rotating the shaft so as to make it operative all of the disks or wheels of Figs. 20 to 30 can be restored to their normal positions, as will be hereinafter further described.

The parts last above referred to may be found in connection with Figs. 7 and 10.

I have now explained that by putting in five pennies the penny-wheel comes to its second zero-point $C^{21}$ and the nickel-wheel brings its projection $C^{22}$ to the operative position. At the same time it is obvious that the wheel for dimes will have moved the same distance as the wheel for nickels; but the zero point or section $C^{44}$ of the dime-wheel is two-twentieths of a circle, and therefore the dime-wheel will be still on the last half of its first zero-section. If now five more pennies be put in, the penny-wheel will come to its third zero-point $C^{45}$, (shown in Fig. 20,) the nickel-wheel will come to its zero-point $C^{46}$, and the dime-wheel will come to the first half of its first operative section $C^{47}$. In like manner if the several steps be followed out it will be found that however the wheel of Fig. 20 may be manipulated by the successive introduction of pennies the correct amount of motion will be imparted to the several wheels in the next section of the sleeve, or to the wheels $C^9$, $C^{10}$, $C^{11}$, and $C^{12}$, and so, also, if motion be imparted to any of the wheels $C^9$, $C^{10}$, $C^{11}$, or $C^{12}$ the correct amount of motion will be imparted and the action of the other parts will not be interfered with. The arrangement of the operative and zero sections of the several wheels is such as to bring about this result.

Referring now to Figs. 14 and 15, they represent the coupling device between the second and third sections of the sleeve $C^5$, and this device differs in some details from the coupling device last described and which connects the first and second sections of the sleeve $C^5$. The particulars in which this coupling differs from the others will be noted. The teeth which engage the pinion $C^{27}$ instead of being arranged in four groups are to be found only in one group or pair, and the boss $C^{48}$, corresponding to the boss $C^{42}$, is varied from the cam portion $C^{43}$ by the extension of the cut-away portion, so as to leave the projecting cam-surface $C^{49}$ as indicated. Within the rim $C^{25}$ there is but one notch $C^{41}$ instead of four, as shown in the rim illustrated in Fig. 12. The action between the two sections of the sleeve is the same, except as modified by these differences just suggested.

Referring now to Figs. 16 and 17, which represent the coupling device connecting the third and fourth sections of the sleeve $C^5$, we find a construction similar to that of Figs. 14 and 15 and Figs. 12 and 13, and I will point out the peculiarities. The teeth $C^{26}$ are arranged in two groups or pairs, the notches $C^{41}$ on the inside of the rim $C^{25}$ are only two in number, and the cut-away portion $C^{43}$ on the boss $C^{42}$ is extended to cover about one-half of the same. Here again these parts are adjusted so as to convey the proper motion from the third to the fourth section. Near the outer extremity of the last or fourth section of the sleeve (shown in Figs. 8, 18, and 19) is a second disk-like part, similar to that illustrated in Fig. 9. It has a hub portion $C^{50}$, the body portion $C^{51}$, and the rim $C^{52}$, and is keyed to the sleeve. Beyond this disk-like part is the flat disk $C^{53}$, having the arm $C^{54}$, which projects up through an opening in the guide-bar $C^{33}$ (shown in Fig. 3) in a manner similar to that of the part $C^{32}$. On this upwardly-projecting portion or near the rim of the disk $C^{53}$ is the stop $C^{55}$, which is adapted to engage a projecting portion $C^{56}$ of the rim $C^{52}$ and limit its motion. Within the rim $C^{52}$ is a resetting-dog, like those illustrated in Figs. 12 and 14, but the inner part of the rim has only one notch $C^{41}$, as is the case in the device of Fig. 14.

The operation of the several devices now described and their cumulative effect is such as in response to the insertion in the machine of a series of coins or bills to bring the several disks or wheels $C^8$ to $C^{18}$, inclusive, into such positions as that their peripheries will be arranged so that their projecting portions or zero-sections will be arranged along a horizontal line—for example, in such a way that they will represent the total sum of money put into the machine for the purpose of the next step in its operation. Thus if we accept, as in the case here illustrated, a horizontal line substantially vertically beneath the axes of these wheels as the line along which they are to produce their operative effect we find that if nothing has been put into the machine all these wheels will stand in the normal position and present a continuous line along their zero-surfaces parallel with their axes and at the closest approach thereto. If now one penny be inserted, the wheel $C^8$ will move one point, and this line will be interrupted by a one-point projection on that wheel, and so on, until the fifth penny is introduced, when this wheel will again pass to zero; but the nickel-wheel will move around so that its projection $C^{22}$ will project beyond the line, and thus stand for a nickel. As previously described, this process of inserting pennies may be continued, the sum total of such pennies being represented by the several wheels up to wheel $C^{12}$. So, also, if nickels, dimes, quarters, or half-dollars be introduced they will be registered in the same manner; but if a sufficient number of pennies or nickels or dimes, or both or all, be inserted to raise the amount to one dollar then the next coupling device operates. Having reference to the projections on the wheels, when the wheel $C^8$ has turned one round it has caused the wheel $C^9$ to turn four-twentieths of a circle and terminate on a blank and has caused the wheel $C^{10}$ to turn four-twentieths of a circle and terminate on two dimes or its highest projection, and when the wheel $C^8$ turns another one-quarter the wheel $C^9$ will turn one-twentieth more, resting on a zero-point, and the wheel $C^{10}$ will turn one-twentieth and will rest on a zero-point, and the wheel $C^{11}$ will have turned one-twentieth farther and will rest on its most elevated point, which stands for a quarter of a dollar. These various elevated points are so arranged in the several wheels that this result continues to work out, so that the amount of money which the position of the wheels represents is indicated, so to speak, by the smallest number of pieces of money of the highest denominations possible to make that amount of money. In like manner the projections and the zero-points of the several succeeding wheels are arranged and related to each other, so as to bring about this result, so that no matter where the money is put in and no matter in what denomination it will result in having the total amount put in expressed by that group of wheels which will stand for the largest denominations and smallest number of coins or bills capable of expressing the total amount. To do this, it is necessary that the coupling between the first and second sections of the sleeve $C^5$ shall be such as to move the second section one-twentieth of a revolution every time the first section moves one-quarter of a revolution, and it is necessary to have the coupling between the second and third sections of the sleeve such that when the second section has rotated a complete revolution the third section will have rotated one-twentieth of a revolution, and when the third section has rotated one-half of a revolution the fourth section will have rotated one-twentieth of a revolution, hence the various arrangements of the teeth and associated parts in these several coupling devices. When all the wheels are at zero, the device illustrated in Figs. 18 and 19 is in the position there shown, and the stop $C^{55}$ limits its action or causes it to come to rest when the several wheels have reached zero. It, however, tends to rotate in the direction indicated by the arrow as the money is introduced, but in time will come to its limit of motion in the opposite direction, and this will be the limit which the machine is built to receive, the amount in this case being one hundred dollars. I will indicate the highest projection on the penny-wheel by $C^{56}$, the highest projection on the nickel-wheel by $C^{22}$, and the highest projection on the dime-wheel by $C^{57}$. These projections are all shown in Fig. 5, but of course not in the same vertical plane, for the several wheels are at their zero-points. If now these wheels and the similar wheels which would be shown on a prolongation of the sleeve $C^5$ were turned as suggested, so that some of their highest points were arranged on a horizontal line, it is obvious that they would present an irregular horizontal arrangement or would present a series of downward projections of different lengths from the center of the axis of rotation. When they are arranged in such a position, representing a certain amount of money introduced, they are then to be again manipulated, for if they were then moved so as to operate the discharging mechanisms they would discharge the entire amount represented by such wheels, or, in other words, the entire amount put into the machine. They have therefore to be again operated in a reverse direction, so as to respond to the amount of money used in the purchase, and thus leave the wheels in a new set of positions corresponding to the difference between the entire amount of money and that charged up against the purchase, and this mechanism I will now describe.

I will now refer particularly to parts shown in Figs. 2 and 3. E E are a series of ratchet-wheels, (shown in Figs. 3, 7, 8, and 32,) one on each section of the sleeve. The teeth of these ratchet-wheels are set in an opposite direction from those of the ratchet-wheels $C^4$. Each is associated with a ratchet-bar $E'$, which is pivoted at $E^2$ to an elbow crank-lever $E^3$, which is pivoted at the fixed point $E^4$. The short arm of the elbow crank-lever is pivoted at $E^5$ to an arm $E^6$ on the bar $E^7$, which has near its other end an arm $E^8$, the lower end of which is pivoted at $E^9$ to a link $E^{10}$, the other end of the link being pivoted at a fixed point $E^{11}$, as indicated in dotted lines in Fig. 3. The elbow crank-lever is held by the spring $E^{12}$ in the position shown in Fig. 3. $E^{13}$ $E^{13}$ indicate purchase-buttons, each normally retracted by a spring $E^{14}$ and mounted on a rod $E^{15}$, which passes through and is guided by the front of the case between the coin-receivers or coin-tubes. These rods are flattened out at their inner ends, as indicated at $E^{16}$, and pass through slots in the inner guide-piece $E^{17}$, and each has a pin $E^{18}$ to prevent it from being too far retracted by the spring $E^{14}$. Each of these rods carries a pin $E^{19}$, placed so that when the rod is pushed inwardly it will be received into the jaws $E^{20}$ on the outer end of the link $E^{21}$, which is pivoted at $E^{22}$ to the bar $E^7$ and which rests upon the stop-pin $E^{23}$. As the button is pushed in against the spring $E^{14}$ it is obvious that the pin $E^{19}$ will engage the jaws $E^{20}$ of the link $E^{21}$, and by a continuation of this motion it is evident that the bar $E^7$ will be forced downwardly. This, however, changes the position of the point $E^5$, and thus the elbow crank-lever is rocked on its pivot $E^4$ and the bar $E'$ is pushed backwardly or inwardly, and thus the sleeve portion with which it is associated is rotated in a direction opposite to that in which it has been previously rotated, as shown in the previous description. Thus the purchase-button when operated tends to rotate a sleeve-section in one direction, whereas the coin-receiving mechanism when operated tends to rotate it in the opposite direction. It is the resultant of these two sets of motions which will bring the disks to the proper positions hereinafter to be referred to. The links $E^{21}$ are of different lengths, and thus it happens that by the operation of different buttons the bar $E^7$ will be moved varying distances and the disks will be rotated varying distances. There may be any number of these buttons and their connections with the sleeves or sleeve-sections may be different from those shown; but the results will be the same in any case. A similar statement may be made touching the disks or wheels illustrated in Figs. 20 to 30 and their division on the basis of twentieths, and the arrangement of the several zero spaces and projections can of course be varied to suit the conditions and according to the will of the constructor within certain limits. Having completed these several operations attendant upon introducing the coin and making the purchase calculation or registration, it will be found that the several disks or wheels are so arranged, as previously suggested, that their downwardly-projecting points represent the difference between the sum of money introduced and that which has been consumed by the purchase. The next operation of the machine is to discharge into the drawer to be handed back to the purchaser the difference between these two sums or the change.

I will now describe the parts shown particularly in Figs. 4, 31, and 32. The crank $D'$ is arranged on the outside of the case and is adapted to operate the shaft $D^2$, which carries within the case the gear-wheel $D^3$, found in Figs. 4 and 34 of the drawings, which meshes with the gear-wheel $D^4$. This gear-wheel $D^4$ is mounted on the stud $D^5$, on which are also mounted the gear-wheels $D^6$, $D^7$, and $D^8$. These four gear-wheels are connected so as to rotate together on the stud. The three gear-wheels $D^6$, $D^7$, and $D^8$ are mutilated, as indicated in Fig. 31. The gear-wheel $D^6$ meshes with the idler-pinion $D^9$ on the stud $D^{10}$, which idler meshes with the gear-wheel $D^{11}$, mounted on the stud $D^{12}$, which stud is in line with the shaft $C^6$ when in its normal position, which relates to the resetting mechanism to be described hereinafter. The gear-wheel $D^7$ meshes with the pinion $D^{13}$ on the shaft $D^{14}$. This shaft carries a series of eccentrics $D^{15}$, (shown in Figs. 3 to 5 and 32,) which are disposed each between two arms $D^{16}$, pivoted on a shaft $D^{17}$. These arms constitute, in fact, one end of an elbow crank-lever pivoted on the shaft $D^{17}$, the other end of which is the arm $D^{18}$, which encircles the sleeve $C^5$. $D^{19}$ $D^{19}$ are projecting pieces on which the shaft $D^{14}$ is mounted and which have forwardly-projecting parts $D^{20}$, (shown in Figs. 7 and 8,) slotted at their outer ends, as indicated at $D^{21}$, to permit the shaft $C^6$ to rise and fall under the action of the elbow crank-lever $D^{16}$ $D^{18}$. The connection of the arm $D^{18}$ with the shaft $C^6$ is such as to permit this motion of the shaft. Thus if the crank $D'$ be rocked or moved it will turn the gear-wheel $D^3$ and the gear-wheel $D^4$. It will require two revolutions of the crank to give one revolution of the gear-wheel $D^4$, and the direction and motion of the wheel $D^4$ is indicated by the arrow in Fig. 31. In this figure the parts are shown in their normal position to begin operation, and when the crank begins to turn the wheel $D^7$ begins to engage the pinion $D^{13}$ and to rotate the same. This, through the elbow crank-lever $D^{16}$ $D^{18}$ and associated parts, operates to depress the shaft $C^6$ and its sleeve and associated parts, and the wheels will all descend and will operate the discharging mechanism in accordance with the arrangement of such disks.

Referring to Fig. 3, the wheel representing quarters is almost in position to engage the discharging mechanism below it, and if it were moved far enough around it would indicate one quarter or be arranged so that when it was made to descend with the shaft it would operate the discharging mechanism sufficiently to discharge a quarter. If it were on the zero-point, as indicated in Fig. 3 in full lines, it would not discharge any quarter, for no quarter-piece would be necessary for the purpose of giving out the change required to be given. The parts which I will now refer to are found largely in Figs. 6, 33, and 34. I will now describe this discharging mechanism and then return to the resetting mechanism, which has been alluded to. F F are a series of projections (shown in Fig. 4) on the inside of the case, which are provided each with two pins $F'$ $F'$, which are received into the slot $F^2$ in the vertically-sliding rack-bar $F^3$, which meshes with the pinion $F^4$, rotating on the shaft $F^5$. This pinion has a rearwardly-developed hub $F^6$, to which is secured a shield $F^7$, shaped as shown in Figs. 5 and 6. This shield is formed with an annular rim, which is cut away at $F^8$ to permit the action of the dog $F^9$, which is mounted on an arm $F^{10}$ on the hub $F^{11}$ on the shaft. This dog is held in operative position by the spring $F^{12}$, attached to one end, while the other end is adapted when it registers with the opening $F^8$ to project through the shield and engage one of the notches $F^{13}$ $F^{13}$ on the inside of the cam-wheel $F^{14}$, which is also loosely mounted concentric with the shaft. This cam-wheel has on the side opposite the shield a sinuous cam-groove $F^{15}$, (shown in Figs. 3 and 5,) which receives a roller $F^{16}$ on the end of the elbow crank-lever $F^{17}$, which is pivoted at $F^{18}$ to the projecting end of the part F. The other end of this elbow crank-lever is secured to the inner end of the coin-discharging rod D or the bill-discharging rod $K^{24}$, as the case may be. Thus it is evident that when any given rack-bar $F^3$ is depressed by being engaged by a projecting part on the wheel above it when the latter descends the bar $F^3$ will descend and rotate the pinion $F^4$, thus carrying the shield $F^7$ in a direction opposite to that indicated by the arrow in Fig. 6. The distance which it rotates the shield will depend upon the extent of the downward movement of the rack-bar $F^3$, and this in turn depends upon the position of the wheel above it. The shaft $C^6$ is made to perform the cycle and descend and ascend by a single revolution of the shaft $D^{14}$. By this time, however, the gear-wheel $D^8$ will have rotated so far as that its teeth begin to engage with the teeth of the gear-wheel G on the shaft $F^5$ and will rotate the same. This motion begins before the completion of the preceding motion, but after the shield has been set. The rotation of the shaft $F^5$ will in the first instance cause the dog $F^9$ to begin to travel in the direction indicated by the arrow in Fig. 6, and since the shield has been set back the dog will soon drop through the open space $F^8$ and engage one of the notches $F^{13}$ and begin to move the cam-wheel $F^{14}$. This will of course operate the elbow crank-lever $F^{17}$, and thus throw the coin-discharge rod D or the bill-discharge rod $K^{24}$ outwardly and cause it to discharge one coin or bill. If the parts are set so that this motion continues, it will discharge more coins or bills and continue the operation until all of the coins or bills called for by the position of the shield incident to the arrangement of the associated disk or wheel above have been discharged. This dog having thus caused the cam-wheel to rotate far enough to discharge the requisite number of coins of the particular denomination must of course be arrested in its operation or otherwise it would continue to move such cam-wheel, and therefore I provide the cam $G'$, (shown in Figs. 5, 6, and 32,) which is loosely mounted on the shaft $F^5$ and is associated with the notched wheel $G^2$, which is in turn associated with the spring-bar $G^3$, which has the detent $G^4$ to engage the notches of the wheel $G^2$, and thus hold the cam $G'$, as it were, in a fixed position. This position is predetermined. When the dog $F^9$ has performed its function and moved the cam-wheel as far as it should, the cam $G'$ is so set that it will engage the tail of the dog and lift it out of engagement with such cam-wheel.

It will be understood, of course, that in describing any given piece of mechanism the same description will apply to the duplicates thereof to the extent they are required in the construction of the entire machine.

Having thus carried these several operations, so far at least as they concern the operation of the machine, to a completion and having described first the operation of the mechanism dependent on the introduction of money to set the selector wheels or disks and then the operation of the purchase-buttons to reverse the action of these selector wheels or disks and having now described how the depression of these disks results in the discharge of the requisite number of proper coins to make the change, I will explain the operation of the mechanism intended to restore these several parts to their proper or normal or starting position. The operation of the crank $D'$ rotates the shaft $D^2$, as previously stated, and thus through a series of wheels the gear-wheel $D^{11}$ on the stud $D^{12}$. (Shown in Figs. 5 and 31.) Attached to this gear-wheel $D^{11}$ is an arm J, which carries at its upper end the pivoted dog $J'$, upwardly pressed by the spring $J^2$, so that its forward end tends to remain seated in the notch $J^3$ in the disk $J^4$. Associated with the dog $J'$ is the fixed pin $J^5$, which tends to lift it out of such notch at the proper moment. $J^4$ is a disk keyed to the extreme end of the shaft $C^6$. This device rotates the shaft $C^6$ one entire revolution, thus operating all of the resetting devices, (illustrated, for example, in Figs. 12, 14, 16, and 18,) so as to restore all of these selector wheels or disks to their normal or zero positions. This action will take place because of the mutilation of the gear-wheel $D^6$ after the shaft $C^6$ has been restored to its initial position in line with the stud $D^{12}$. Under these conditions all the parts have been restored to their normal condition after their complete operation. We have, however, certain other conditions to consider.

Referring to Fig. 2, the device shown is the left-hand side of the machine as viewed from the position of the operator and is an elevation of that portion of the mechanism which has to do with the handling of bills when bills instead of coins are employed.

The parts which I shall now refer to are found particularly in Figs. 32, 33, 44, and 45. K K are inserter-buttons, each on a rod $K'$, which is encircled by a spring $K^2$, which tends to keep the button in its normal position. The inner end of this rod has a ratchet formation $K^3$, which engages the ratchet-wheel $K^4$ on the shaft $K^5$, which shaft carries a drum $K^6$, having on one end the gear $K^7$. Each rod $K'$ is provided with a long guiding portion $K^8$, so that it can be pushed in and retain its proper position, and is also held up elastically by the spring $K^9$ against the ratchet-wheel $K^4$. The upper rods $K'$ have downwardly-projecting inner ends $K^{10}$, while the lower rods $K'$ have similar upwardly-projecting portions $K^{11}$, which bring their ends to approximately the same point as the inner ends of the middle rods $K'$. Each of these rods is provided with a ratchet-bar $K^{12}$, which corresponds with the ratchet-bars $C^2$, though in this case the ratchet-bars are arranged to operate upon the ratchet-wheels on the sleeve-sections, so as to rotate the latter in the same sense as they are rotated by the ratchet-bars $C^2$, connected with the coin-inserting devices. $K^{13}$ is a drum having the outer gear-wheel $K^{14}$, which meshes with the gear-wheel $K^7$. The drums $K^6$ and $K^{13}$ are suitably mounted on the inner frame-pieces $K^{29}$, and in the lower portion of said frame-pieces $K^{29}$, one placed at each end of the case, is a roller $K^{15}$. The lower drum $K^{13}$ is mounted, as indicated in Fig. 32, upon the standards $K^{16}$, projecting upwardly from the bottom of the case. The front portion of the case A is interrupted by the slots $K^{17}$, and from these slots outwardly project the platforms $K^{18}$, the outer ends of which are overhung by the curved portions $K^{19}$ of the frame A. In these curved portions $K^{19}$ are mounted the rollers $K^{20}$, the lower roller being mounted beneath the inward lip of the lower portion $K^{21}$ of the case. A tape $K^{22}$ is wound up on each drum $K^{13}$, and its forward end is carried down under the roller $K^{15}$ and under the roller $K^{20}$ and above the platform $K^{18}$ and under the drum $K^6$, to which its end is made fast. In the case of the lower drum the tape is wound on the drum $K^{13}$ and passes off the top of the same under the roller $K^{20}$, over the platform $K^{18}$, and under and about the drum $K^6$, to which it is attached. In each of these smaller drums $K^{13}$ there is placed a coiled spring $K^{23}$, so as to keep the tape taut. This spring is shown in Fig. 45, the same being a spiral spring secured to the shaft and the exterior drum. To insert a bill, it is laid upon the tape on top of the platform $K^{18}$ and the button K is pressed inwardly, whereupon the drums rotate and the bill is wound in upon the drum $K^6$ beneath the tape, being thus held in position, and as other bills are put in they are wound up in an endless series, so to speak, about the drum $K^6$. I have shown narrow tapes; but of course this is a mere matter of detail, as any desired modification of the tape can be made. To discharge any of these bills, I use a discharging mechanism substantially the same as that previously described with regard to the discharge of coins. The discharge-rod D, however, will be removed, and there will be substituted for it the discharge-bar $K^{24}$, which is attached to the elbow crank-lever $F^{17}$ and is provided with a rack at its other end. This rack is adapted to engage a pinion on the shaft $K^5$, and thus to reverse the motion of the drum $K^6$ and unwind the bill and throw it out upon the tape on top of the platform $K^{18}$. It is obvious that the parts will be slightly varied in position, so as to bring the levers to the right point to make the proper connection with the various rack-bars $K^{24}$ $K^{24}$, associated with the different drums. These rack-bars are the substantial equivalents of each other, though they vary in length and in shape slightly to accommodate themselves to the various positions of their associated drums. Each rack-bar $K^{24}$ is held up against its pinion $K^{25}$ on the shaft $K^5$ by a spring $K^{26}$; but the rack-bar should normally be out of engagement with the pinion, so as to permit the ratchet-wheel and ratchet-bar to perform their functions in connection with the insertion of the bill. This is accomplished by providing the end of the rack-bar with a blank portion which rides upon the teeth of the pinion when the rack-bar is down, as it would be under ordinary conditions; but when it is raised by the action of the mechanisms which set in operation the coin-discharging devices it speedily comes into operative connection with the pinion. The spring $K^{26}$ bears against an enlargement on the end of the bar $K^{24}$, as indicated in Fig. 36, and therefore soon loses its control of the bar; but there is on one side of this bar a web $K^{27}$, which engages a fixed pin $K^{28}$, and by this means the rack-bar is held in engagement with the pinion even after the spring $K^{26}$ ceases to act. This arrangement prevents the tapes from being manipulated by hand when the discharge-bar $K^{24}$ has been partially operated, thus allowing a number of bills to be extracted from the machine not called for in making change. This would be the case if some such arrangement—as, for instance, a ratchet—were used.

I have now described the apparatus by which either paper or coin may be inserted and also the mechanism by which the change will be given out; but it is evident that there may be coins and paper money of the same denominations—as, for example, the one-dollar bill and the one dollar in silver—if the machine is as here illustrated applied to United States currency. It is obvious, therefore, that there must be some relation between the one-dollar-bill part of the mechanism and the silver-dollar part of the mechanism, and this relation I have established as follows: The mechanism is arranged so that if there is a paper dollar in the machine and if the change calls for a paper dollar the paper dollar will be given out, and so that if there be no paper in the machine then a silver dollar will be automatically substituted therefor. The mechanism is also arranged so that either a silver or a paper dollar can be first thrown out as change, if either is in the machine. The mechanism for accomplishing this result I will now proceed to describe.

The parts to which I shall now refer are shown largely in Figs. 34, 35, 36, 37, 40, and 41. The wheel $C^{13}$ is adapted to serve to throw out one dollar as change. Whether the one dollar be silver or paper is determined by the mechanism about to be described. M M are indicators, which indicate the amount of money of any given denomination in the machine. $M'$ is a totalizer to show the number of silver dollars in the machine, and $M^2$ is a deficiency-indicator similar to those hereinbefore described, but so associated with parts shortly to be described as to indicate a deficiency of both paper and silver dollars and as to show how many silver dollars are lacking in the change which the machine has thrown out. For instance, if there were no paper dollars in the machine and three dollars and forty-five cents were to be thrown out as change and there were only two silver dollars in the machine these two silver dollars would be thrown out, the index $M'$ would go back to zero, and the index $M^2$ would show that one dollar, which ought to have been thrown out, had not been thrown out. This index, however, would not make this indication if there should have been two half-dollars which were thrown out instead of the one silver dollar. This matter of substitution will be further examined later; but we will now proceed with the substitution of the silver and paper dollars one for the other. The paper-dollar roll $K^6$ on the shaft $K^5$ has projecting from it the pin $M^3$, (shown in Figs. 34, 37, 40, and 41,) which projects into the concave recesses $M^4$ in the periphery of the wheel $M^5$, keyed on the shaft $M^6$. This shaft is mounted in the frame $M^7$. This pin, therefore, is adapted to engage the teeth $M^8$ on the periphery of the wheel. Loose on the shaft $M^6$ is the indicator-wheel $M^9$, from which wheel projects a flange $M^{10}$, having the long notch $M^{11}$ therein. Keyed to the shaft $M^6$ is a somewhat similar wheel $M^{12}$, having the flange $M^{13}$, with the short notch $M^{14}$ therein. The wheel $M^9$ is the tens-wheel and the wheel $M^{12}$ is the units-wheel, and each of these wheels has on its outer periphery, as indicated in Fig. 37, a series of digits. These digits, however, are arranged in reverse order of progression, as indicated in Fig. 37, in connection with the wheels of the totalizer $M'$, soon to be described. $M^{15}$, as shown in Figs. 34, 35, and 37, is an arm having a laterally-projecting part $M^{16}$, to which is secured a spring-dog $M^{17}$, having the two terminals $M^{18}$ and $M^{19}$, the terminal $M^{18}$ adapted to engage the notch on the flange $M^{10}$ and the terminal $M^{19}$ to engage the notch on the flange $M^{13}$. In the wheel $M^{12}$ is an annular groove $M^{20}$, in which travel the short teeth $M^{21}$ on the pinion $M^{22}$, which has three similarly distanced long teeth $M^{23}$ and which is rigid on the shaft $M^{24}$, which is in turn journaled in the frame $M^7$. In the bottom of this groove $M^{20}$ are the two teeth $M^{25}$, corresponding to which is formed a depression in the outer portion of the drum $M^{12}$, into which the long teeth $M^{23}$ of the pinion are to be received. The teeth $M^{25}$ once in every revolution of the wheel $M^{12}$ would engage the pinion $M^{22}$ and cause it to partially rotate. Around the inner edge of the wheel $M^9$ are a series of teeth, (indicated in dotted lines in Fig. 41,) as $M^{26}$, which are adapted to be engaged by the long teeth of the pinion $M^{22}$. Thus when the wheel $M^{12}$ is moved one revolution the pinion $M^{22}$ will move far enough to drive the pinion $M^9$ one notch or space represented by one of the digits on its surface. Since the pinion $M^5$ is on the shaft $M^6$ with the pinion $M^{12}$, the latter is moved by the motion of the drum $K^6$ through the pin $M^3$, and the parts are so proportioned that when a bill is introduced the drum $M^{12}$ will be moved one notch or space, and when it is moved all the way around then the wheel $M^9$, through the pinion $M^{22}$, will be moved one space in the same direction, and thus complete the record of all the one-dollar bills inserted in the machine as made by this apparatus. As the bills are fed out and the drum travels in the opposite direction this operation is of course reversed, and the indicator or totalizer will always show how many bills there are in the bill-receiver. It will be understood that the indicator is to be read looking at it on the opposite side from the view shown in Fig. 37.

The parts to which I shall now refer are shown largely in Figs. 36, 37, 38, and 29.

I will now describe the totalizer for the silver dollars. The structure is very similar. N is the shaft in the frame $N'$, on which are journaled the wheels $N^2$ and $N^3$. $N^2$ is the tens-wheel, having the digits about its surface properly spaced and the flange $N^4$ with the long notch $N^5$. $N^3$ is the units-wheel, having the inner flange $N^6$, the groove $N^7$, digits $N^8$, properly spaced on its surface, and the outer hub $N^9$, provided with the notches $N^{10}$. The groove $N^7$ has two teeth $N^{11}$ $N^{11}$, adapted to be engaged by the short teeth $N^{12}$ on the pinion $N^{13}$, which is on the short shaft $N^{14}$, which is journaled in the frame. The pinion is provided also with long teeth $N^{15}$, which engage a recess or notch in the flange $N^6$, which corresponds with the space between the two teeth $N^{11}$ $N^{11}$. The wheel $N^3$ has a flange $N^{16}$, which is provided with a short notch $N^{17}$. The arm or bar $B^{13}$, as shown in Figs. 34 and 36, associated with the coin-inserter which is associated with the silver dollars, is provided with a long slot $N^{18}$, as shown in Fig. 36. This slot is of any desired length, but proportioned with reference to the cut-away part $C^7$ of the ratchet-bar $C^2$ at the other end of the lever C, so as to get the proper movement of the wheel $C^{13}$. Attached to this lever C, Fig. 36, is the dog $N^{19}$, which is downwardly depressed by the spring $N^{20}$ and which is provided with an outer point $N^{21}$, adapted to engage the notches $N^{10}$ in the hub $N^9$ and when the bar $B^{13}$ is retracted to move the wheel $N^3$ one space to indicate that one silver dollar has been introduced. When the wheel $N^3$ has in response to such action made a complete revolution, the short teeth on the pinion $N^{13}$ will be turned and one of its long teeth $N^{15}$ will be in position to be received in the recess or notch in the flange $N^6$ and will project into one of the notches $N^{22}$ on the wheel $N^2$, and thus cause it to move one space. Obviously by the operation of this mechanism the indicator will indicate the number of silver dollars which are in the machine. On the bar D is a hook $A^{14}$, which has at one end the upwardly-projecting roll $A^{15}$, journaled on the pin $N^{25}$. As the bar D is thrust forward in the direction indicated by the arrow in Fig. 36 to throw out a silver dollar this pin $N^{25}$ will engage the lower end of the arm $N^{26}$, which is pivoted at $N^{27}$ on the rear of the coin-receptacle B and the lower end of which is pressed toward the left by the spring $N^{28}$. The pin $N^{25}$ will only strike the bottom end of the arm $N^{26}$ when a coin is being discharged, in which case the pin $N^{25}$ will be pushed upwardly, as shown in Fig. 35, by the action of the lever $C^{19}$, elsewhere described. Secured on this arm $N^{26}$ at $N^{29}$ is the dog $N^{30}$, which is pressed upwardly at its outer end by the spring $N^{31}$. The forward end of this dog is provided with a flat surface, from which projects a tooth $N^{32}$ to engage one of the notches $N^{10}$ in the wheel $N^9$. As shown in Fig. 36, the tooth is not in engagement with the notch; but if the bar D comes forward, as indicated, this dog $N^{30}$ will be thrust forward and its tooth will engage one of the notches and turn the wheel $N^3$ in the opposite direction to which it was rotated by the dog $N^{19}$, and thus subtract, as it were, one dollar. Thus by the action of these several devices there will always be a correct indication by this indicator of the number of silver dollars in the machine.

Referring now to Figs. 35, 36, and 37, associated with the totalizer for the silver dollars, is a structure which is substantially the same as that described in connection with the totalizer for the paper dollars. This structure consists of the arm $N^{33}$, having the laterally-diverging part $N^{34}$, from which projects the spring-arm $N^{35}$, having the end $N^{36}$ associated with the notched flange $N^4$ and the end $N^{37}$ associated with the notched flange $N^{16}$. The ends $M^{18}$ and $M^{19}$, as well as the ends $N^{36}$ and $N^{37}$, have V-shaped knife-edge devices $N^{38}$ to engage the notches in question. The two arms $N^{33}$ and $M^{15}$ are joined, so as to form the part $N^{39}$, which is pivoted at its rear end at $N^{40}$ to the forwardly-projecting arm or portion $N^{41}$ of the frame-piece F, which is associated with the silver-dollar mechanism. The bar $N^{39}$ terminates in the handle $N^{42}$, which projects through a forwardly-bulging portion of the face of the case $N^{43}$. Secured in the two arms $M^{15}$ and $N^{33}$ is the rod $N^{44}$, as shown in Figs. 34, 35, and 36, to the outer end of which is pivoted the depending link $N^{45}$, which has a laterally-projecting finger $N^{46}$, over which travels the bar D.

I will now explain in what manner the machine will operate to throw out as change a paper dollar when the silver dollars have all been passed out as change. Referring to the mechanism shown in Figs. 36, 38, and 39, the notches $N^5$ and $N^{17}$ are so arranged as that when all but one silver dollar have been fed out the knife-edges $N^{38}$ on the spring-bar $N^{35}$ will drop into both of these notches, and thus as it were lock the two wheels $N^2$ and $N^3$. If now the machine be operated to throw out a silver dollar as change, the bar D will come forward and will, through the bar $N^{26}$ and the dog $N^{30}$, tend to rotate the wheel $N^3$, and the hook $N^{38}$, being caught on the notch of that wheel, will be forced downwardly, carrying with it the lever $N^{39}$. At the end of this stroke the indicator will show that there are no silver dollars in the machine, the wheels will be in the position shown in Fig. 38, and the lever will be in the position shown in dotted lines in Fig. 36. Since the arm $N^{45}$ is suspended from the lever $N^{39}$, this downward movement of the lever will cause this arm $N^{45}$ to descend, together with its finger $N^{46}$, and thus the bar D will be lowered at its forward end and put out of position to push out silver dollars. In other words, it will drop into a groove $N^{47}$ in the lower plate $B^2$. As this arm $N^{42}$ descends it carries with it the link $N^{48}$, which rocks the pivoted dog $N^{49}$ and releases the spring $K^{26}$, as illustrated in Fig. 36. This spring forces the rack-bar $K^{24}$ against the pinion $K^{25}$, so that it is ready to discharge the paper dollar. Thus this bar $K^{24}$, which is, in fact, the discharger-bar to operate the dollar-bill mechanism, is thrown into operation as a result of the dollar-coin-discharging mechanism being thrown out of operation, and thus if there be no more silver dollars in the machine and a dollar is called for in change it will be fed out from the paper-dollar roll. The mechanism will continue to operate to throw out paper dollars until all of the paper dollars are exhausted, whereupon by a like movement of the other V-shaped knife-pieces $N^{38}$ with reference to the paper-dollar indicators and associated parts the arm $N^{39}$ will be raised and the parts restored to the position in which they belong to feed out silver dollars which may have been inserted in the machine during the interval. By manipulating the handle $N^{42}$ at will the machine can be made to feed either paper or silver dollars; but it cannot be made to feed both simultaneously, nor will it do this automatically. If now there be no dollar either in paper or silver in the machine, then it is necessary that the machine should substitute. It may, for example, substitute two half-dollars, or for one half-dollar it may substitute two quarters, and so on throughout the machine. The parts to which I shall now refer are found largely in Figs. 4, 34, 35, 36, and 37. I will describe one device for this substituting operation. The cam-lever piece $A^{13}$ projects into the path of the roll $A^{15}$ on the coin-discharge bar D. It is pivoted at O and has a forwardly-extended end portion with a roll O', which projects into the path of the coin, as indicated in Fig. 4. If there be a coin in the coin-receptacle with which these parts are associated, the bar D when it comes forward will tend to push a coin out, and this will engage the roll O' and rock the lever $A^{13}$ on its pivot O, and the other end of such lever will engage the roll $A^{15}$ and rock the hook $A^{14}$, so as to take the hook end $A^{16}$ out of the path of the upstanding pivoted arm $O^2$, and thus prevent the mechanism for showing the failure to discharge a coin from operating, such mechanism being the deficiency-indicator in the case of the lower coin or coins where no substitution is made. These deficiency-indicators may be associated with any coin or bill receptacle where substitution is impossible—i. e., with pennies or when it is inexpedient for any reason or where it is desirable to limit the amount of substitution, as hereinafter described. The upper end of the arm $O^2$ is provided with a pivot-rod $O^3$ in a slot $O^4$ in the dog $O^5$. The rod $O^3$ is surrounded by a spiral spring $O^6$, its ends associated with the parts $O^2$ and $O^5$, so as to keep the dog $O^5$ at its upward limit of motion.
This dog $O^5$ works in connection with the ratchet-wheel $O^7$, so as to operate the deficiency-indicator and show that a coin of the denomination in question should have been thrown out, when, as suggested, there is no coin in the coin-receiver with which the particular discharge-bar D has been operated. Every time, therefore, that this particular bar D is pressed forward without discharging a coin the deficiency-indicator is moved one notch to indicate that in the particular change in question there is lacking one coin of the denomination in question. The mechanism is so related, as shown, for example, in Fig. 6, and the parts are so timed that the discharging devices of the coins of lower denomination will not have completed their operation before those of higher denomination, but will complete their operation after the operation of those of higher denomination is completed, so as to allow for substitution; but instead of the machine thus indicating deficient change it may substitute for such omitted dollar required to make correct change two half-dollars, and the mechanism for doing this I will now proceed further to describe.

Referring now to Figs. 3, 4, 34, and 36, when the hook $A^{16}$ is in position by reason of the lack of a dollar in the coin-receiver to engage the projection $O^8$ on the pivoted arm $O^2$ it will rock the rock-shaft $O^9$, on which the arm $O^2$ is secured, and thus the arm $O^{10}$, also on the rock-shaft $O^9$, is rocked. To the upper end of this rock-arm is secured one of the ratchet-bars $O^{11}$ $O^{11}$ or a bar similar thereto. Each of these bars $O^{11}$ is provided with several teeth $O^{12}$ to engage the ratchet-teeth on the ratchet-wheel $O^{13}$ to rotate the cam G', which is associated with such ratchet-wheel, referring to Fig. 6. It will bring this cam G' in the case of the substitution from one dollar to two half-dollars a distance represented by two notches in the cam-wheel $F^{14}$, for the ratchet-bar $O^{11}$ will move far enough to bring about this result. The cam G' and the ratchet-wheel $O^{13}$ are arranged to travel together. The notched wheel $G^2$ is also arranged to travel with the cam G' and the ratchet-wheel $O^{13}$, and by this same action it is moved around two notches, overcoming the spring-stop $G^4$ to that extent. As previously described, the dog $F^9$ operates through the slot in the sleeve to move the cam-wheel $F^{14}$, and it is limited in its action by the position of the cam G', it is obvious that this dog $F^9$ when it is operated as previously described in connection with the description of the shield $F^7$ and its function will move the cam-wheel $F^{14}$ as far as it is determined by the position of the slot $F^8$ in the shield and the tripping-cam G' for the purpose of throwing out, for example, one coin of the denomination of the half-dollar. If now, as has just been described, the cam G', which limits the action of the cam-wheel $F^{14}$, has been moved to a new position—as, for example, two notches forward—then it is clear that the dog $F^9$ will not be thrown out of operation until it has operated the cam-wheel $F^{14}$ far enough to throw out not only one half-dollar, (to do which it is set by the position of the slot,) but also two more coins of one-half dollar each, which are thus substituted for the one dollar of silver. In like manner the substituting mechanism will operate from one coin to another, so that two nickels will be substituted for a dime, &c. The details of these several substitutions it is not necessary to fully show or describe. This also is true of other duplicate parts which have been sometimes omitted from the drawings for the sake of avoiding confusion. I have not shown mechanism for substituting two nickels for a dime, because it would be a further complication of the drawings, and the mechanism would be precisely the same as that for substituting two quarters for a half-dollar, which mechanism, with other like mechanism, is shown elsewhere in the drawings. This cam G' must of course after the operation of discharging the coins or throwing out the change has been completed be restored to its normal position, or the position indicated in Fig. 6. I shall now describe this resetting mechanism, referring particularly to Figs. 3, 4, 5, 32, and 33. P is a shaft arranged in the frame of the machine, having a series of arms P', to the lower end of each of which arms is secured the rack-bar $P^2$, which engages the pinion $P^3$, and the motion just described by which the cam G' is moved forward would obviously move these rack-bars forward and rock the shaft P in its bearings, for the pinion $P^3$ is rigid with the cam G'. Each of the arms P' is loose on the shaft P; but at the side of each of these arms is a short crank-arm P⁴, keyed to the shaft and having a pin P⁵, which engages the arm P'. At one extremity of the shaft P is the short crank-arm P⁶, which at the last motion of the crank D' will be engaged by the projecting cam P⁷, so as to rotate the shaft P and withdraw the racks and restore the parts to the position indicated in Fig. 6.

There is but one lever A³ for each of the three coin-tubes of lowest denomination, and it acts when the machine is unable to give the correct change; but others might be used, if desired—as, for example, one for each of the coin-tubes.

B¹⁷ is a lip at the side of each coin-receptacle B near the bottom to guide the coins into their receptacles.

P⁸ is a finger rigid with the cam G'.

P⁹ is a projection on the rim of the shield F⁷. At the time when the rack P² resets the cam G' the finger P⁸ resets the shield F⁷ by contact with the projection P⁹. (See Figs. 4, 5, and 6.)

In Figs. 4, 34, 35, 36, 37, and 43 a device is shown for limiting the amount of substitution. It may be applied to the machine wherever desired, but is shown only for limiting the amount substituted from the silver dollars to half-dollars. The ratchet-wheel O¹³, associated with the half-dollar mechanism, has but two ratchet-teeth and has a cam projection O¹⁴ in proper position to act on the upstanding arm O¹⁵ from the rock-shaft O¹⁶. At the other end the rock-shaft O¹⁶ has the arm O¹⁷, to which is connected the link O¹⁸ and operates the bell-crank lever O¹⁹ to pull down the rod O²¹, which has a pin O²² in its upper end to engage above the dog O⁵. A spring O²⁰, secured to the standard B² and to the bell-crank lever O¹⁹, tends to hold the arm O¹⁵ against the cam O¹⁴ and the dog O⁵ in its lowered position, where it would not act on the ratchet-wheel O⁷ when thrust forward. The effect produced by this limiting device is as follows: In the bill end of the machine the substituting is done by the engagement of the hook-shaped end R of the link R' with a similar hook-shaped portion R² on the discharge-bars K²⁴. Such engagement occurs when no bill of the required denomination for making the necessary change is in the machine. As long as a bill remains in the machine the spring K²⁶ will hold its bar K²⁴ against the pinion K²⁵, so that any bill required in making change would be fed out by the discharge-bar K²⁴; but in case a bill was called for and was not in the machine the roll or abutment R³ on the pivoted arm R⁴, to which the spring K²⁶ is attached, would lie in the notch R⁵ in the flange R⁶ on the units-wheel of the indexes M and allow the bar K²⁴ to fall away from its pinion K²⁵ and make its stroke without rotating the drum K⁶, as seen in Fig. 44. The index would indicate zero when the roll R³ rests in the notch R⁵. The links R' are guided on the bracket-arms R⁸.

The bill-substituting device (shown in Fig. 32) is, in effect, the same as the coin-substituting devices, but may be briefly described as follows: The hook R on the long arm R' on the end of the lever O², which rocks with the shaft O⁹, is guided at its upper end by the arm R⁸ and is so arranged as to engage the hook R² on the discharge-bar K²⁴ in case this bar K²⁴ is prevented from engaging the toothed wheel K²⁵, which occurs when all the bills are discharged from the bill-receiver to which this particular discharge-bar is connected, as elsewhere described. The remainder of the substituting apparatus for bills is precisely the same as has already been described for coins, excepting in the adaptation of the shape and length of the parts, owing to the difference in the positions of the bill-receivers.

I have used the word "inserter" to indicate a device which would positively insert or draw in or force in the coin or bill, as distinguished from a mere slit, slot, or aperture into or through which the coin or bill may be forced from the outside. The inserter in the case of coins consists of the parts shown above the drawer in Fig. 3 and in the case of bills of the roll and tape devices shown in Fig. 32. I have used the term "totalizer," which is here distinguished from a mere scale or register. The term "totalizer" as I use it implies the idea of a mechanical device which will in a sense perform a calculation, so that the coins or bills will be counted, as it were, either by number or denomination, so that the final result will be exact and conclusive and will state the result of either addition or subtraction or the several processes, and this totalizer will show at any time the amount which is still in the device. The term "deficiency-indicator" I have employed to signify a device which when bills or coins of a certain denomination are exhausted and yet are required for the purpose of making change will indicate the fact of the deficiency. By the term "cash" I mean to indicate either coins, bills, or like evidences of value which may be used in the machine, and I use this term to avoid the necessity of saying "coins" and "bills" or either or both. The word "selector" is used to indicate devices for setting the discharging apparatus so that the coin or bill of the proper denomination to make change with the most suitable coins or bills will be discharged. I have used the term "change-selector" also to indicate a device which is operated upon by the cash-inserters and by the purchase-keys so as to assume a position which is the resultant of these two actions and which leaves the change-selector in a position where it will assist in discharging the proper amount of change. I have used the word "key" or "keys" to indicate the driver or device which is operated upon the occasion of a purchase and which is selected in accordance with the amount of such purchase. I use the word "key" for lack of a more general term, but do not wish to be limited to the particular device shown, as any device which when operated will move the other parts to bring about the desired result will be included in this term. I have used "key" or "keys," therefore, in a broad sense and not as intending thereby to be limited to that particular mechanical device which in this case is shown as a key.

When the machine is in its normal condition, it will be supplied with a sufficient number of coins or bills of every denomination. Under these conditions if the change-selector is operated it will deliver the proper coins or bills to make the desired change with the fewest number of pieces possible. Thus in making change for one dollar and sixty-five cents it will deliver one dollar in paper or silver, one half-dollar, one dime, and one nickel. If the machine does not have the proper coins—as, for example, if it has no half-dollars or no dimes or no nickels—then it is necessary that the machine should contain a device for correcting, as it were, the operation of this change-selector, so as to substitute, for example, two quarters for the half-dollar or five dimes for the half-dollar if there be no quarters and two nickels for the dime if there be no dime and five pennies for the nickel if there be no nickel. This device I call a "change-substituter," for it substitutes for the change normally required to make the proper amount to be delivered other coins so as to make up the same total, but with coins different from those which would normally be selected by the change-selector.

Referring to Fig. 44, M is a totalizer for one of the bills-receivers, having a flange $R^6$, in which is the notch $R^5$, so placed that when the totalizer indicates zero the notch $R^5$ will allow the roller $R^3$ on the arm $R^4$ to drop into it. The arm $R^4$ is pivoted to the frame, as shown, and carries at the opposite end the spring $K^{26}$, which presses against the discharge-bar $K^{24}$, as elsewhere described. If there be no bills in this particular bills-receiver and one should be required in making change, the totalizer would indicate zero or no bills in this receiver, in which case the roller $R^3$ would be resting in the notch $R^5$ and the spring $K^{26}$ would be depressed. The discharge-bar $K^{24}$ would not then be forced into mesh with the pinion $K^{25}$, but the feather $K^{27}$ would pass below the pin $K^{28}$ and the discharge-bar would then engage the substituting mechanism, as elsewhere described. If, however, one or more bills were in the receiver, the roller would be forced out of the notch by the changed position, the totalizer M thus elevating the spring $K^{26}$, forcing the discharge-bar $K^{24}$ into mesh with pinion $K^{25}$ and making the feather $K^{27}$ pass above the pin $K^{28}$. The feather $K^{27}$ is of such a length that the stroke of $K^{24}$ will push its lower end past $K^{28}$, allowing it to return below it and out of mesh with $K^{25}$.

I claim—

1. In a cash-register, the combination of a series of separate receivers, one for each denomination, and a series of mechanical cash-inserters, one for each receiver, to positively insert the coin at the bottom of the stack of coins.

2. In a cash-register, the combination of a series of coin and bill receivers, such coin-receivers being adapted to contain the coins in a stack, with a mechanical cash-inserter for each receiver, such cash-inserter adapted to insert the coin at the bottom of the stack of coins.

3. In a cash-register, the combination of a series of bill-receivers, such bill-receivers adapted to hold the bills removably in a roll, with a mechanical cash-inserter for each receiver, such cash-inserter adapted to insert the bill on the outside of the roll of bills.

4. In a cash-register, the combination of a series of coin and bill receivers, with a mechanical cash-inserter for each receiver, and a totalizer for each receiver, adapted to produce the totals resulting from addition or subtraction.

5. In a cash-register, the combination of a series of coin and bill receivers, with a cash-inserter for each receiver and a totalizer for each receiver, adapted to produce the result from addition or subtraction, and two driving devices for said totalizers, one to operate the totalizers for addition and the other to operate the totalizers for subtraction.

6. In a cash-register, the combination of a cash-receiver, with an aperture which serves both to receive and discharge the cash, and a cash-inserter associated with said aperture to positively introduce the cash into the receiver.

7. In a cash-register, the combination of a cash-receiver, with an aperture which serves both to receive and discharge the cash, and a cash-inserter associated with said aperture and adapted to move with reference to the aperture to positively introduce the cash into the receiver.

8. In a cash-register, the combination of a cash-receiver, having a single discharge and receiving aperture, with a cash-inserter normally at one side of the aperture to permit the discharge of the cash and adapted to be brought in front of the aperture to positively insert the cash therein.

9. In a cash-register, the combination of a cash-receiver, having a single discharge and receiving aperture, with a cash-inserter normally at one side of the aperture to permit the discharge of the cash and adapted to be brought in front of the aperture to insert the cash, and a lock which prevents the motion of such cash-inserter toward the receiver when it is in the discharging position.

10. In a cash-register, the combination of a bill-receiver, comprising a roll on which the bills are wound when received and from which they are unwound when discharged.

11. In a cash-register, the combination of a bills-receiver, comprising a roll, with a bills-inserter, comprising a tape which removably holds and leads the bill toward the roll.

12. In a cash-register, the combination of a bills-receiver, comprising a roll, and a tape-feeder to carry and removably retain the bills upon the roll.

13. In a cash-register, the combination of a bills receiving and discharging device, comprising a roll on which the bills are wound, and means for rotating the roll in either direction.

14. In a cash-register, the combination of a bills receiving and discharging device, comprising a roll on which the bills are wound, and means for rotating the roll in either direction, and a tape device for winding and unwinding the tapes on the roll.

15. In a cash-register, a bills-receiving device, comprising a bills-roll and a tape-roll, a tape adapted to removably hold the bills and means for alternately winding and unwinding the tape on both rolls.

16. In a cash-register, a bills-receiving device, comprising a bills-roll and a tape-roll, a tape adapted to removably hold the bills, and means for alternately winding and unwinding the tape on both rolls, and a table over which the tape travels as it approaches the roll.

17. In a cash-register, the combination of a cash-receiver with a deficiency-indicator brought into operation subsequent to such deficiency.

18. In a cash-register, the combination of a cash-receiver with a deficiency-indicator therefor, brought into operation subsequent to such deficiency, and a change-drawer to receive the discharged change.

19. In a cash-register, the combination of a cash-receiver with a deficiency-indicator therefor and a change-drawer to receive the discharged change, and means for reminding the operator when there is a deficiency in change.

20. In a cash-register, the combination of a cash-receiver with a deficiency-indicator therefor and a change-drawer to receive the discharged change, and means for reminding the operator when there is a deficiency in change, said means consisting of a device for locking the drawer open.

21. In a cash-register, the combination of a cash-receiver with a cash-inserter associated with the receiver and adapted to insert cash therein and a selector operative therewith.

22. In a cash-register, the combination of a cash-receiver with a cash-inserter and a selector driven by such cash-inserter.

23. In a cash-register, the combination of a cash-receiver, with a cash-inserter associated with the receiver and adapted to insert cash therein, a change-selector, means for setting the change-selector to correspond to the amount received, and means for setting back the change-selector corresponding to the value of the purchase.

24. In a cash-register, the combination of a cash-receiver, with a cash-inserter, a change-selector, means for setting the change-selector to correspond to the amount received, driven by such cash-inserter, and means for setting back the change-selector corresponding to the value of the purchase.

25. In a cash-register, the combination of a cash-receiver, with a cash-inserter associated therewith to insert cash therein, a change-selector, means for setting the change-selector to correspond to the amount received, driven by such cash-inserter, means for setting back the change-selector corresponding to the value of the purchase, and purchase-keys for operating such latter means.

26. In a cash-register, the combination of a cash-inserter and a cash-receiver with a change-selector so connected with the cash-inserter as to set the change-selector to correspond to the amount received when the coin is inserted.

27. In a cash-register, the combination of a cash-receiver, with a cash-inserter associated therewith to insert cash therein, a change-selector, and means for setting the change-selector to correspond to the amount received.

28. In a cash-register, the combination of a cash-receiver with a cash-inserter, a change-selector, and means for setting the change-selector to correspond to the amount received, driven by such cash-inserter.

29. In a cash-register, the combination of a cash-inserter and a cash-receiver, with a change-selector so connected with the cash-inserter as to set the change-selector to correspond to the amount received when the coin is inserted, and means for setting back the change-selector corresponding to the value of the purchase.

30. In a cash-register, the combination of a cash-receiver, with a change-selector, purchase-keys and cash-inserter said change-selector operated by the joint action of the cash-inserter and purchase-keys.

31. In a cash-register, the combination of a series of cash-inserters and cash-receivers, with a change-selector so connected with the cash-inserter as to set the change-selector to correspond to the amount received when the coin is inserted.

32. In a cash-register, the combination of a series of cash-receivers, with a series of cash-inserters associated therewith to insert cash therein, a change-selector, and means for setting the change-selector to correspond to the amount received.

33. In a cash-register, the combination of a series of cash-receivers, with a series of cash-inserters, a change-selector, and means for setting the change-selector to correspond to the amount received, driven by such cash-inserters.

34. In a cash-register, the combination of a series of cash-inserters and cash-receivers, with a change-selector so connected with the cash-inserter as to set the change-selector to correspond to the amount received when the coin is inserted, and means for setting back the change-selector corresponding to the value of the purchase.

35. In a cash-register, the combination of a series of cash-receivers, with a series of cash-inserters associated therewith to insert cash therein, a change-selector, means for setting the change-selector to correspond to the amount received, and means for setting back the change-selector corresponding to the value of the purchase.

36. In a cash-register, the combination of a series of cash-receivers, with a series of cash-inserters, a change-selector, means for setting the change-selector to correspond to the amount received, driven by such cash-inserters, and means for setting back the change-selector corresponding to the value of the purchase.

37. In a cash-register, the combination of a series of cash-receivers, with a series of cash-inserters associated therewith to insert cash therein, a change-selector, means for setting the change-selector to correspond to the amount received, means for setting back the change-selector corresponding to the value of the purchase, and a series of purchase-keys for operating such latter means.

38. In a cash-register, the combination of a series of cash-receivers, with a series of cash-inserters, a change-selector, means for setting the change-selector to correspond to the amount received, driven by such cash-inserters, means for setting back the change-selector corresponding to the value of the purchase, and purchase-keys for operating such latter means.

39. In a cash-register, the combination of a series of cash-receivers, with a series of cash-inserters, and a change-selector driven by such cash-inserters.

40. In a cash-register, the combination of a series of cash-receivers, with a series of cash-inserters, a change-selector driven by such cash-inserters, and means for setting the change-selector to correspond to the amount received.

41. In a cash-register, the combination of a series of cash-receivers, with a series of cash-inserters, a change-selector driven by such cash-inserters, and means for setting the change-selector to correspond to the amount received driven by said cash-inserters.

42. In a cash-register, the combination of a series of cash-receivers, with a series of cash-inserters, a change-selector driven by such cash-inserters, and means for setting back the change-selector corresponding to the value of the purchase.

43. In a cash-register, the combination of a series of cash-receivers, with a change-selector, a series of cash-inserters and a series of purchase-keys, such change-selector driven by such purchase-keys and the cash-inserters.

44. In a cash-register, a cash-inserter, a purchase-key in combination with a change-selector responsive to the cash-inserter and responsive to a purchase-key, so as to assume a position appropriate for the discharge of the proper amount of change.

45. In a cash-register, the combination of a cash-inserter and purchase-key with a cash-receiver, a cash-inserter, and a change-selector responsive to the cash-inserter and responsive to a purchase-key, so as to assume a position appropriate for the discharge of the proper amount of change.

46. In a cash-register, the combination of a cash-inserter a purchase-key with a series of cash-receivers, a series of cash-inserters and a change-selector responsive to the cash-inserters and responsive to a purchase-key, so as to assume a position appropriate for the discharge of the proper amount of change.

47. In a cash-register, the combination of a cash-receiver, with a cash-inserter, purchase-keys, and a change-selector operated by such cash-inserter and purchase-keys.

48. In a cash-register, the combination of a series of cash-receivers, with a series of cash-inserters, a series of purchase-keys, and a change-selector operated by such cash-inserters and purchase-keys.

49. In a cash-register, the combination of a cash-receiver, with a cash-inserter, and a change-selector driven in part by such cash-inserter.

50. In a cash-register, the combination of a series of cash-receivers, with a series of cash-inserters, and a change-selector driven in part by such cash-inserters.

51. A change-selector, consisting of a movable device in combination with the inserting mechanism such mechanism being adapted to move it in one direction when the money is introduced and means for moving it in the opposite direction when the amount of the purchase is determined and in proportion to such amount.

52. A change-selector, consisting of a movable device in combination with the inserting mechanism such mechanism being adapted to move it in one direction when the money is introduced and means for moving it in the opposite direction when the amount of the purchase is determined and in proportion to such amount, and means whereby such change-selector can then be operated to aid in discharging the proper change.

53. In a cash-register, the combination of a cash-inserter, a purchase-key with a calculator containing a change-selector driven by the cash-inserter and purchase-key.

54. In a cash-register, the combination of a series of cash-receivers for different denominations with a change-selector and a change-substituter associated with such receivers and operative upon the cash therein.

55. In a cash-register, the combination of a series of cash-receivers for different denominations with a change-selector and a change-substituter and a change-discharger associated with such receivers and operative upon the cash therein.

56. In a cash-register, the combination of a series of cash-receivers, each for a given denomination, with a series of change-dischargers operating in connection with such cash-receivers, and a change-substituter associated with the dischargers.

57. In a cash-register, the combination of a series of cash-receivers for currency of the same denomination but different form, and a substituter to substitute one for the other.

58. In a cash-register, the combination of a series of cash-receivers for cash of different denominations with a substituting mechanism and coin-dischargers.

59. In a cash-register, the combination of a series of cash-receivers for receiving currency in the form of bills, with a cash-receiver for receiving currency in the form of coin, and means for substituting one for the other in making change.

60. In a cash-register, the combination of a series of cash-receivers, means for delivering change and a drawer with devices to automatically lock it open when there is a deficiency in the change delivered.

61. In a cash-register, a bill-receiving roll and registering devices to indicate the number of bills received on the roll or the number of bills retained on the roll.

62. In a cash-register, a bill-receiving roll in combination with means for inserting the bill and removably securing it about such roll.

63. In a cash-register, the combination of a roll, with means for winding and holding the bills on the same as they are inserted, and means for unwinding and discharging the bills from the same as they are required for change.

64. In a cash-register, a bill-receiving roll in combination with a tape which travels on the roll and a receiving-aperture through which the bill can be inserted so as to be removably held between the tape and the roll.

65. In a cash-register, a bill-receiving roll in combination with a tape which travels on the roll and a receiving-aperture through which the bill can be inserted so as to be removably held between the tape and the roll, and means for turning the roll so as to secure the bills on the roll by means of the tape.

66. In a cash-register, a bill-receiving roll in combination with a tape which travels on the roll and a receiving-aperture through which the bill can be inserted between the tape and the roll, means for turning the roll so as to secure the bills on the roll by means of the tape, and means for reversing the roll to unwind the tape and discharge the bills.

67. In a cash-register, the combination of a series of cash-receivers for different denominations, with a series of cash-inserters associated with the receivers and adapted to insert cash therein, a series of purchase-keys, a selector to select the change in relation to the receipt and purchase amounts, and change-discharging devices.

68. In a cash-register, a change-selector having a device for limiting the amount of money that can be inserted at a single operation of the machine to the amount of change that can be made, in combination with devices for making change.

69. In a cash-register, a change-selector adapted to discharge a certain amount of change, with receiving devices adapted to receive money, the two related so that the aggregate amount of change either in amounts of higher or lower denominations dischargeable subsequent to the receipt of money in the receiving devices cannot exceed the value of the money last received in such devices.

70. In a cash-register, a change-discharger having a wheel, a cam, a driving-dog to rotate the cam, and a part to trip the driving-dog so as to throw it out of action when the proper number of coins have been discharged.

71. In a cash-register, the combination of a change-discharger and a change-substituter to substitute one denomination of currency for another.

72. In a cash-register, a change-discharger and a change-substituter to substitute one denomination of currency for another, in combination with a limiting device to limit the substitution which can take place.

73. In a machine of the character described, the combination of receptacles for containing pieces of money in separate denominations in piles or stacks, means for inserting pieces of money in the lower part of the stack and means for ejecting a piece or pieces of money from the stack or stacks, substantially as described.

SAMUEL G. COOK.

Witnesses:
HOMER L. KRAFT,
MARGARET CASHIN.